US012709292B2

(12) United States Patent
Imai et al.

(10) Patent No.: US 12,709,292 B2
(45) Date of Patent: Aug. 18, 2026

(54) TRAVEL ASSIST SYSTEM, TRAVEL ASSIST METHOD, AND TRAVEL-ASSIST CONTROL PROGRAM

(71) Applicant: DENSO CORPORATION, Kariya-city (JP)

(72) Inventors: Kenichiro Imai, Kariya-city (JP); Toru Nagura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 171 days.

(21) Appl. No.: 18/485,237

(22) Filed: Oct. 11, 2023

(65) Prior Publication Data

US 2024/0043035 A1 Feb. 8, 2024

Related U.S. Application Data

(63) Continuation of application No. PCT/JP2022/015614, filed on Mar. 29, 2022.

(30) Foreign Application Priority Data

Apr. 13, 2021 (JP) ................................ 2021-067859
Nov. 25, 2021 (JP) ................................ 2021-191388

(51) Int. Cl.
*B60W 60/00* (2020.01)
*B60W 50/00* (2006.01)
(Continued)

(52) U.S. Cl.
CPC ..... *B60W 60/001* (2020.02); *B60W 2050/009* (2013.01); *B60W 50/0098* (2013.01); *B60W 50/06* (2013.01); *B60W 2050/065* (2013.01); *B60W 2555/20* (2020.02); *B60W 2556/05* (2020.02); *B60W 2556/45* (2020.02);
(Continued)

(58) Field of Classification Search
CPC .... B60W 60/001; B60W 50/06; B60W 60/00; B60W 2556/45; B60W 2555/20; B60W 2556/05; B60W 50/0098; B60W 2050/009; B60W 2050/065; G16Y 40/30; G16Y 10/40; G16Y 20/20; G08G 1/09
See application file for complete search history.

(56) References Cited

U.S. PATENT DOCUMENTS 4,620,066 A * 10/1986 Bushnell ................ H04M 3/51 379/230
2016/0370801 A1* 12/2016 Fairfield ............. G05D 1/0038
(Continued)

*Primary Examiner* — Jay Khandpur
(74) *Attorney, Agent, or Firm* — Precision Patents, P.C.

(57) ABSTRACT

In a travel assist system, a travel assist control unit selectively performs an off-peak task upon receiving at least one assistance request during an off-peak situation where there are a predetermined number of free operators included in a first group. The off-peak task assigns the at least one assistance request to a selected one of the free operators included in the first group. The travel assist control unit selectively performs an on-peak task upon receiving the at least one assistance request during an on-peak situation where there are not the predetermined number of the free operators included in the first group. The on-peak task analyzes assignment of the at least one assistance request to a selected one of second operators included in a second group in accordance with a priority level of the at least one assistance request.

18 Claims, 16 Drawing Sheets

(51) Int. Cl.
*B60W 50/06* (2006.01)
*G08G 1/09* (2006.01)
*G16Y 10/40* (2020.01)
*G16Y 20/20* (2020.01)
*G16Y 40/30* (2020.01)

(52) U.S. Cl.
CPC ................ *G08G 1/09* (2013.01); *G16Y 10/40* (2020.01); *G16Y 20/20* (2020.01); *G16Y 40/30* (2020.01)

(56) References Cited

U.S. PATENT DOCUMENTS

| | | | | |
|---|---|---|---|---|
| 2020/0202705 | A1 | 6/2020 | Sakai et al. | |
| 2022/0126862 | A1* | 4/2022 | Xiao ................. | B60W 50/0205 |
| 2023/0109606 | A1 | 4/2023 | Sakai et al. | |
| 2024/0427325 | A1* | 12/2024 | Elliott .................... | G06N 3/006 |

* cited by examiner

54

OPERATOR WORKING-SITUATION DATABASE

| OPERATOR ID | OPERATOR TYPE | CURRENT SITUATION |
|---|---|---|
| 00001 | MANAGEMENT | STANDBY STATE |
| 00002 | MANAGEMENT | ADDRESSING |
| 00003 | INSTRUCTION | ADDRESSING |
| ⋮ | ⋮ | ⋮ |
| 00101 | MANAGEMENT | ADDRESSING |
| 00102 | INSTRUCTION | ADDRESSING |
| 00103 | INSTRUCTION | STANDBY STATE |
| ⋮ | ⋮ | ⋮ |

58

ASSISTANCE-LOG DATABASE

| OCCURRENCE TIME | ASSISTANCE CONTENT | PRIORITY LEVEL | OPERATOR ID | ELAPSED TIME | TARGET TIME | PREDICTED REMAINING TIME |
|---|---|---|---|---|---|---|
| 9:00 | PROBLEM STARTING VEHICLE | 1 | 00003 | 00:05 | 01:00 | 00:55 |
| 9:02 | UNKNOWN | UNKNOWN | *** | *** | *** | *** |
| 9:03 | SAFETY CHECKING | 2 | 00102 | 00:03 | 01:00 | 00:57 |
| 9:05 | OCCURRENCE OF ACCIDENT | 10 | *** | *** | 05:00 | *** |
| ⋮ | ⋮ | ⋮ | ⋮ | ⋮ | ⋮ | ⋮ |

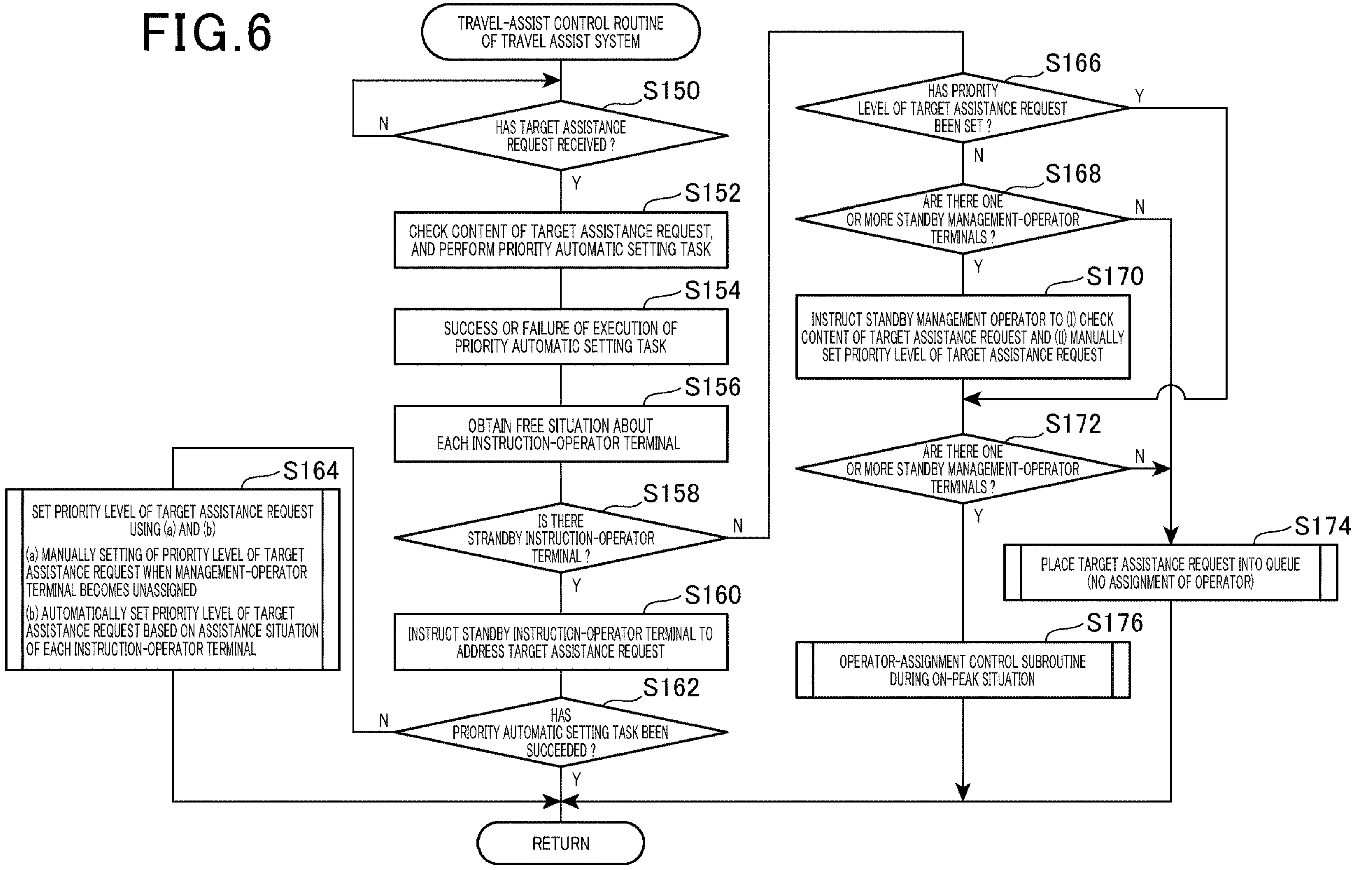
FIG.6
TRAVEL-ASSIST CONTROL ROUTINE OF TRAVEL ASSIST SYSTEM
S150
HAS TARGET ASSISTANCE REQUEST RECEIVED ?
N
Y
S152
CHECK CONTENT OF TARGET ASSISTANCE REQUEST, AND PERFORM PRIORITY AUTOMATIC SETTING TASK
S154
SUCCESS OR FAILURE OF EXECUTION OF PRIORITY AUTOMATIC SETTING TASK
S156
OBTAIN FREE SITUATION ABOUT EACH INSTRUCTION-OPERATOR TERMINAL
S158
IS THERE STANDBY INSTRUCTION-OPERATOR TERMINAL ?
N
Y
S160
INSTRUCT STANDBY INSTRUCTION-OPERATOR TERMINAL TO ADDRESS TARGET ASSISTANCE REQUEST
S162
HAS PRIORITY AUTOMATIC SETTING TASK BEEN SUCCEEDED ?
N
Y
S164
SET PRIORITY LEVEL OF TARGET ASSISTANCE REQUEST USING (a) AND (b)
(a) MANUALLY SETTING OF PRIORITY LEVEL OF TARGET ASSISTANCE REQUEST WHEN MANAGEMENT-OPERATOR TERMINAL BECOMES UNASSIGNED
(b) AUTOMATICALLY SET PRIORITY LEVEL OF TARGET ASSISTANCE REQUEST BASED ON ASSISTANCE SITUATION OF EACH INSTRUCTION-OPERATOR TERMINAL
RETURN
S166
HAS PRIORITY LEVEL OF TARGET ASSISTANCE REQUEST BEEN SET ?
Y
N
S168
ARE THERE ONE OR MORE STANDBY MANAGEMENT-OPERATOR TERMINALS ?
N
Y
S170
INSTRUCT STANDBY MANAGEMENT OPERATOR TO (I) CHECK CONTENT OF TARGET ASSISTANCE REQUEST AND (II) MANUALLY SET PRIORITY LEVEL OF TARGET ASSISTANCE REQUEST
S172
ARE THERE ONE OR MORE STANDBY MANAGEMENT-OPERATOR TERMINALS ?
N
Y
S174
PLACE TARGET ASSISTANCE REQUEST INTO QUEUE (NO ASSIGNMENT OF OPERATOR)
S176
OPERATOR-ASSIGNMENT CONTROL SUBROUTINE DURING ON-PEAK SITUATION

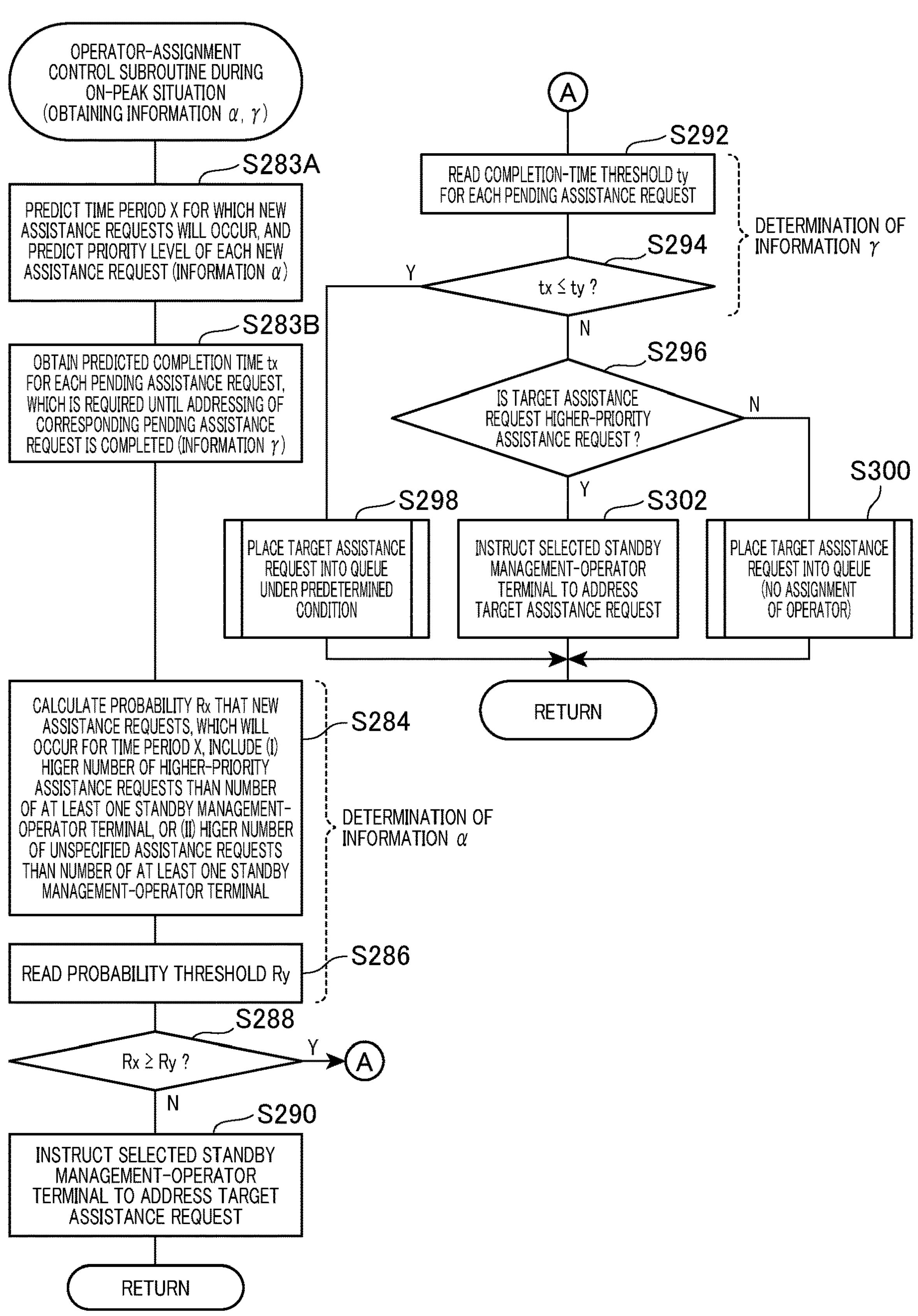
FIG.12
OPERATOR-ASSIGNMENT CONTROL SUBROUTINE DURING ON-PEAK SITUATION (OBTAINING INFORMATION α, γ)
S283A
PREDICT TIME PERIOD X FOR WHICH NEW ASSISTANCE REQUESTS WILL OCCUR, AND PREDICT PRIORITY LEVEL OF EACH NEW ASSISTANCE REQUEST (INFORMATION α)
S283B
OBTAIN PREDICTED COMPLETION TIME tx FOR EACH PENDING ASSISTANCE REQUEST, WHICH IS REQUIRED UNTIL ADDRESSING OF CORRESPONDING PENDING ASSISTANCE REQUEST IS COMPLETED (INFORMATION γ)
S284
CALCULATE PROBABILITY Rx THAT NEW ASSISTANCE REQUESTS, WHICH WILL OCCUR FOR TIME PERIOD X, INCLUDE (I) HIGER NUMBER OF HIGHER-PRIORITY ASSISTANCE REQUESTS THAN NUMBER OF AT LEAST ONE STANDBY MANAGEMENT-OPERATOR TERMINAL, OR (II) HIGER NUMBER OF UNSPECIFIED ASSISTANCE REQUESTS THAN NUMBER OF AT LEAST ONE STANDBY MANAGEMENT-OPERATOR TERMINAL
DETERMINATION OF INFORMATION α
S286
READ PROBABILITY THRESHOLD Ry
S288
Rx ≥ Ry ?
Y
N
A
S290
INSTRUCT SELECTED STANDBY MANAGEMENT-OPERATOR TERMINAL TO ADDRESS TARGET ASSISTANCE REQUEST
RETURN
A
S292
READ COMPLETION-TIME THRESHOLD ty FOR EACH PENDING ASSISTANCE REQUEST
DETERMINATION OF INFORMATION γ
S294
tx ≤ ty ?
Y
N
S296
IS TARGET ASSISTANCE REQUEST HIGHER-PRIORITY ASSISTANCE REQUEST ?
N
Y
S298
PLACE TARGET ASSISTANCE REQUEST INTO QUEUE UNDER PREDETERMINED CONDITION
S302
INSTRUCT SELECTED STANDBY MANAGEMENT-OPERATOR TERMINAL TO ADDRESS TARGET ASSISTANCE REQUEST
S300
PLACE TARGET ASSISTANCE REQUEST INTO QUEUE (NO ASSIGNMENT OF OPERATOR)
RETURN

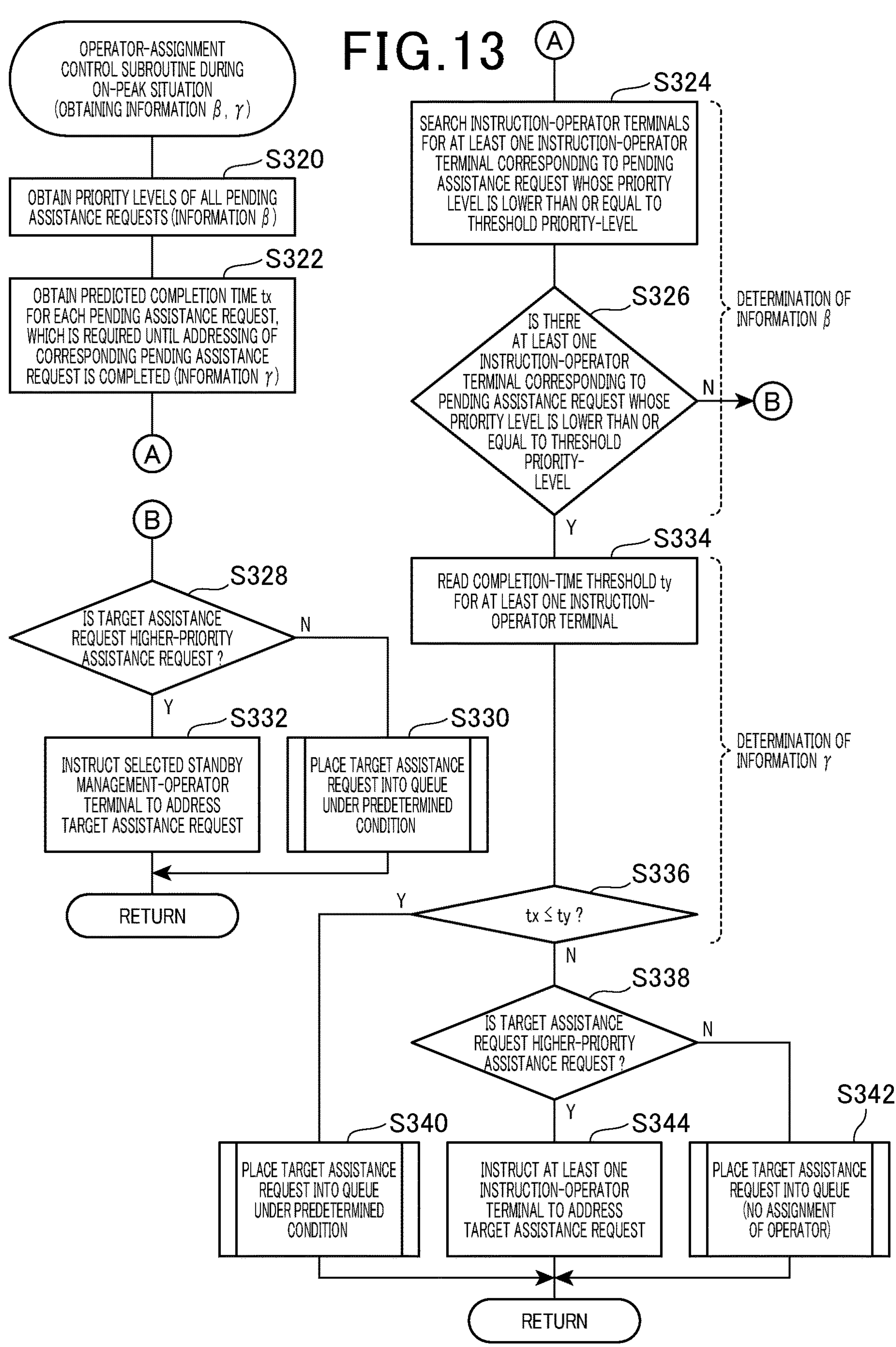
FIG.13
OPERATOR-ASSIGNMENT CONTROL SUBROUTINE DURING ON-PEAK SITUATION (OBTAINING INFORMATION β, γ)
S320
OBTAIN PRIORITY LEVELS OF ALL PENDING ASSISTANCE REQUESTS (INFORMATION β)
S322
OBTAIN PREDICTED COMPLETION TIME tx FOR EACH PENDING ASSISTANCE REQUEST, WHICH IS REQUIRED UNTIL ADDRESSING OF CORRESPONDING PENDING ASSISTANCE REQUEST IS COMPLETED (INFORMATION γ)
A
B
S328
IS TARGET ASSISTANCE REQUEST HIGHER-PRIORITY ASSISTANCE REQUEST ?
N
Y
S332
INSTRUCT SELECTED STANDBY MANAGEMENT-OPERATOR TERMINAL TO ADDRESS TARGET ASSISTANCE REQUEST
S330
PLACE TARGET ASSISTANCE REQUEST INTO QUEUE UNDER PREDETERMINED CONDITION
RETURN
A
S324
SEARCH INSTRUCTION-OPERATOR TERMINALS FOR AT LEAST ONE INSTRUCTION-OPERATOR TERMINAL CORRESPONDING TO PENDING ASSISTANCE REQUEST WHOSE PRIORITY LEVEL IS LOWER THAN OR EQUAL TO THRESHOLD PRIORITY-LEVEL
S326
IS THERE AT LEAST ONE INSTRUCTION-OPERATOR TERMINAL CORRESPONDING TO PENDING ASSISTANCE REQUEST WHOSE PRIORITY LEVEL IS LOWER THAN OR EQUAL TO THRESHOLD PRIORITY-LEVEL
N
B
Y
DETERMINATION OF INFORMATION β
S334
READ COMPLETION-TIME THRESHOLD ty FOR AT LEAST ONE INSTRUCTION-OPERATOR TERMINAL
DETERMINATION OF INFORMATION γ
S336
tx ≤ ty ?
Y
N
S338
IS TARGET ASSISTANCE REQUEST HIGHER-PRIORITY ASSISTANCE REQUEST ?
N
Y
S340
PLACE TARGET ASSISTANCE REQUEST INTO QUEUE UNDER PREDETERMINED CONDITION
S344
INSTRUCT AT LEAST ONE INSTRUCTION-OPERATOR TERMINAL TO ADDRESS TARGET ASSISTANCE REQUEST
S342
PLACE TARGET ASSISTANCE REQUEST INTO QUEUE (NO ASSIGNMENT OF OPERATOR)
RETURN

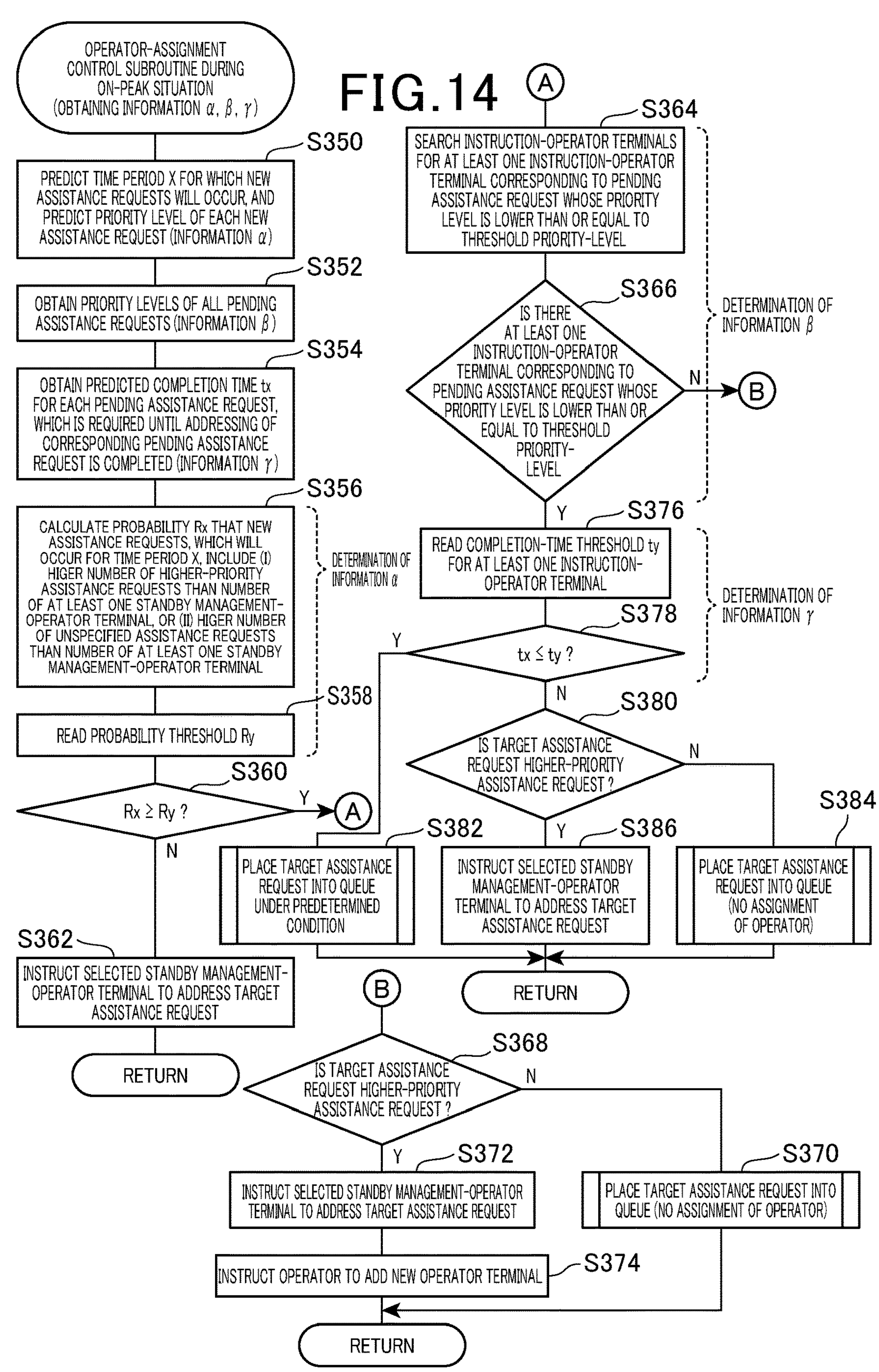
FIG.14
OPERATOR-ASSIGNMENT CONTROL SUBROUTINE DURING ON-PEAK SITUATION (OBTAINING INFORMATION α, β, γ)
S350
PREDICT TIME PERIOD X FOR WHICH NEW ASSISTANCE REQUESTS WILL OCCUR, AND PREDICT PRIORITY LEVEL OF EACH NEW ASSISTANCE REQUEST (INFORMATION α)
S352
OBTAIN PRIORITY LEVELS OF ALL PENDING ASSISTANCE REQUESTS (INFORMATION β)
S354
OBTAIN PREDICTED COMPLETION TIME tx FOR EACH PENDING ASSISTANCE REQUEST, WHICH IS REQUIRED UNTIL ADDRESSING OF CORRESPONDING PENDING ASSISTANCE REQUEST IS COMPLETED (INFORMATION γ)
S356
CALCULATE PROBABILITY Rx THAT NEW ASSISTANCE REQUESTS, WHICH WILL OCCUR FOR TIME PERIOD X, INCLUDE (I) HIGER NUMBER OF HIGHER-PRIORITY ASSISTANCE REQUESTS THAN NUMBER OF AT LEAST ONE STANDBY MANAGEMENT-OPERATOR TERMINAL, OR (II) HIGER NUMBER OF UNSPECIFIED ASSISTANCE REQUESTS THAN NUMBER OF AT LEAST ONE STANDBY MANAGEMENT-OPERATOR TERMINAL
DETERMINATION OF INFORMATION α
S358
READ PROBABILITY THRESHOLD Ry
S360
Rx ≥ Ry ?
Y
A
N
S362
INSTRUCT SELECTED STANDBY MANAGEMENT-OPERATOR TERMINAL TO ADDRESS TARGET ASSISTANCE REQUEST
RETURN
A
S364
SEARCH INSTRUCTION-OPERATOR TERMINALS FOR AT LEAST ONE INSTRUCTION-OPERATOR TERMINAL CORRESPONDING TO PENDING ASSISTANCE REQUEST WHOSE PRIORITY LEVEL IS LOWER THAN OR EQUAL TO THRESHOLD PRIORITY-LEVEL
S366
IS THERE AT LEAST ONE INSTRUCTION-OPERATOR TERMINAL CORRESPONDING TO PENDING ASSISTANCE REQUEST WHOSE PRIORITY LEVEL IS LOWER THAN OR EQUAL TO THRESHOLD PRIORITY-LEVEL
N
B
DETERMINATION OF INFORMATION β
Y
S376
READ COMPLETION-TIME THRESHOLD ty FOR AT LEAST ONE INSTRUCTION-OPERATOR TERMINAL
S378
tx ≤ ty ?
DETERMINATION OF INFORMATION γ
Y
N
S380
IS TARGET ASSISTANCE REQUEST HIGHER-PRIORITY ASSISTANCE REQUEST ?
N
Y
S382
PLACE TARGET ASSISTANCE REQUEST INTO QUEUE UNDER PREDETERMINED CONDITION
S386
INSTRUCT SELECTED STANDBY MANAGEMENT-OPERATOR TERMINAL TO ADDRESS TARGET ASSISTANCE REQUEST
S384
PLACE TARGET ASSISTANCE REQUEST INTO QUEUE (NO ASSIGNMENT OF OPERATOR)
RETURN
B
S368
IS TARGET ASSISTANCE REQUEST HIGHER-PRIORITY ASSISTANCE REQUEST ?
N
Y
S372
INSTRUCT SELECTED STANDBY MANAGEMENT-OPERATOR TERMINAL TO ADDRESS TARGET ASSISTANCE REQUEST
S370
PLACE TARGET ASSISTANCE REQUEST INTO QUEUE (NO ASSIGNMENT OF OPERATOR)
INSTRUCT OPERATOR TO ADD NEW OPERATOR TERMINAL
S374
RETURN

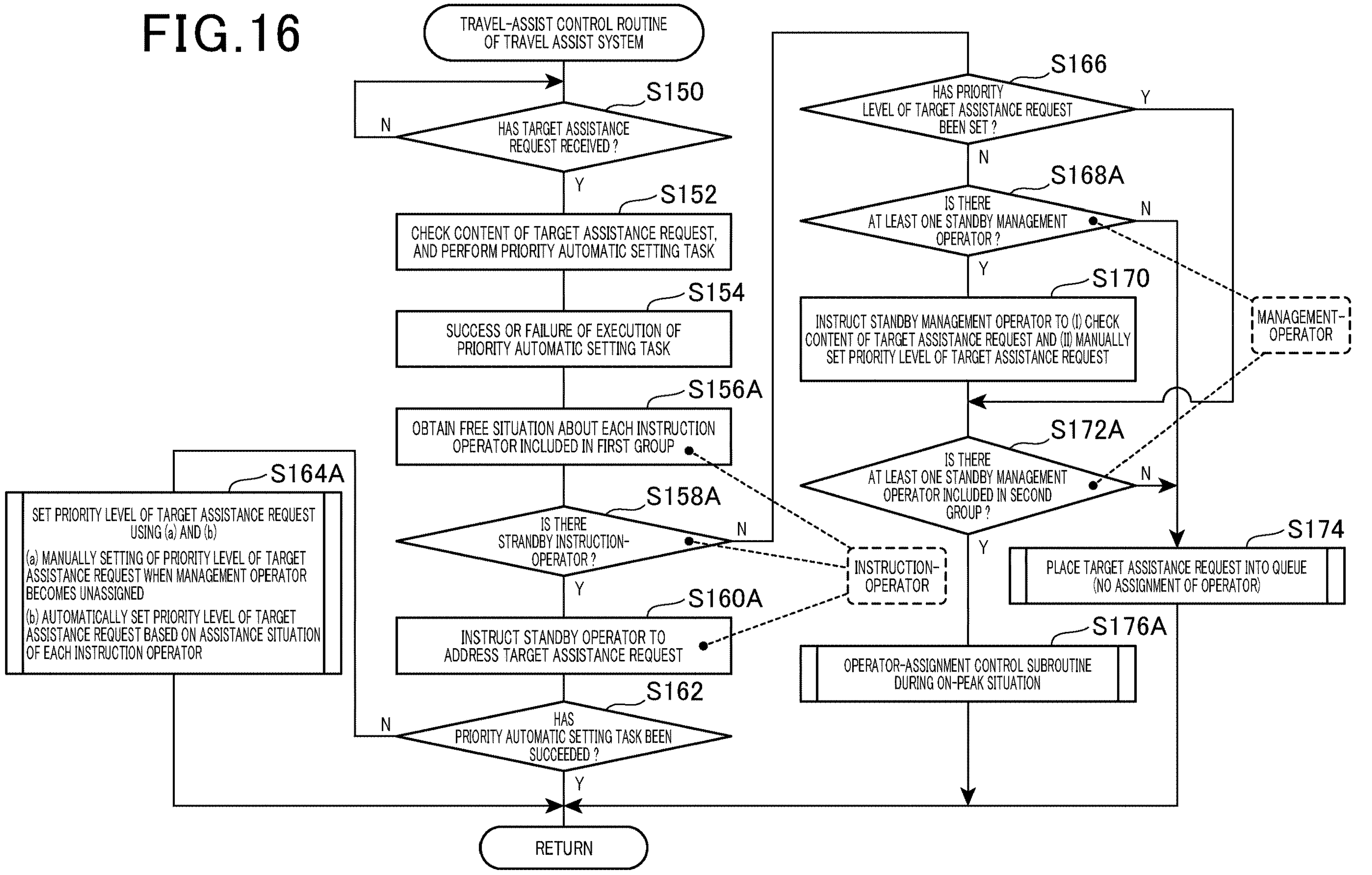
FIG.16
TRAVEL-ASSIST CONTROL ROUTINE OF TRAVEL ASSIST SYSTEM
S150
HAS TARGET ASSISTANCE REQUEST RECEIVED ?
N
Y
S152
CHECK CONTENT OF TARGET ASSISTANCE REQUEST, AND PERFORM PRIORITY AUTOMATIC SETTING TASK
S154
SUCCESS OR FAILURE OF EXECUTION OF PRIORITY AUTOMATIC SETTING TASK
S156A
OBTAIN FREE SITUATION ABOUT EACH INSTRUCTION OPERATOR INCLUDED IN FIRST GROUP
S158A
IS THERE STRANDBY INSTRUCTION-OPERATOR ?
N
Y
S160A
INSTRUCT STANDBY OPERATOR TO ADDRESS TARGET ASSISTANCE REQUEST
S162
HAS PRIORITY AUTOMATIC SETTING TASK BEEN SUCCEEDED ?
N
Y
RETURN
S164A
SET PRIORITY LEVEL OF TARGET ASSISTANCE REQUEST USING (a) AND (b)
(a) MANUALLY SETTING OF PRIORITY LEVEL OF TARGET ASSISTANCE REQUEST WHEN MANAGEMENT OPERATOR BECOMES UNASSIGNED
(b) AUTOMATICALLY SET PRIORITY LEVEL OF TARGET ASSISTANCE REQUEST BASED ON ASSISTANCE SITUATION OF EACH INSTRUCTION OPERATOR
INSTRUCTION-OPERATOR
S166
HAS PRIORITY LEVEL OF TARGET ASSISTANCE REQUEST BEEN SET ?
Y
N
S168A
IS THERE AT LEAST ONE STANDBY MANAGEMENT OPERATOR ?
N
Y
MANAGEMENT-OPERATOR
S170
INSTRUCT STANDBY MANAGEMENT OPERATOR TO (I) CHECK CONTENT OF TARGET ASSISTANCE REQUEST AND (II) MANUALLY SET PRIORITY LEVEL OF TARGET ASSISTANCE REQUEST
S172A
IS THERE AT LEAST ONE STANDBY MANAGEMENT OPERATOR INCLUDED IN SECOND GROUP ?
N
Y
S174
PLACE TARGET ASSISTANCE REQUEST INTO QUEUE (NO ASSIGNMENT OF OPERATOR)
S176A
OPERATOR-ASSIGNMENT CONTROL SUBROUTINE DURING ON-PEAK SITUATION

TRAVEL ASSIST SYSTEM, TRAVEL ASSIST METHOD, AND TRAVEL-ASSIST CONTROL PROGRAM

REFERENCE TO RELATED APPLICATIONS

This application is a bypass continuation application of currently pending international application No. PCT/JP2022/015614 filed on Mar. 29, 2022 designating the United States of America, the entire disclosure of which is incorporated herein by reference, the international application being based on and claiming the benefit of priority from Japanese Patent Application No. 2021-067859 filed on Apr. 13, 2021, and Japanese Patent Application No. 2021-191388 filed on Nov. 25, 2021, the disclosures of each of which are incorporated in their entirety herein by reference.

TECHNICAL FIELD

The present disclosure relates to travel assist systems, travel assist methods, and travel-assist control programs for assisting overall autonomous-drive services related to vehicle traveling. Overall autonomous-drive services are not limited to vehicle-travel assistances, and can include a service of making sure opening and closing of the vehicle's doors is performed. Travel assist or travel assistance will be used hereinafter because the following will describe mainly assistance of vehicle traveling, but travel assist or travel assistance can include overall autonomous-drive services.

BACKGROUND OF THE INVENTION

The development of autonomous driving of vehicles, such as automobiles, has been advancing. In particular, the development of autonomous vehicles is increasing; each of the autonomous vehicles includes a control system that performs acceleration, steering, and braking autonomously. Such an autonomous vehicle enables a driver to manually drive the autonomous vehicle only in response to a manual drive request from the control system.

With the increase in these autonomous vehicles, the development of fail-operational technologies has been advancing. Such a fail-operational technology remotely controls the control system of an autonomous vehicle to ensure safety traveling in a case where a failure in the control system hinders autonomous driving of the autonomous vehicle.

Japanese Patent Application Publication No. 2020-102159 discloses a technology of controlling an autonomous vehicle appropriately even if an abnormal situation has occurred in or around the autonomous vehicle.

Specifically, the disclosed technology is configured such that a monitoring terminal operable by a monitoring operator checks whether an abnormal situation has occurred in or around each autonomous vehicle in accordance with information items sent from the respective autonomous vehicles. Then, upon determination that the abnormal situation has occurred, the disclosed technology determines initial travel instructions, each of which can include a checking operation of the occurred abnormal situation, in response to the abnormal situation, and transmits the initial travel instructions respectively to anomaly-related autonomous vehicles related to the abnormal situation.

The disclosed technology thereafter sets a priority order among the anomaly-related autonomous vehicles in accordance with (i) the degree of risk of each of the anomaly-related autonomous vehicles to the abnormal situation, and (ii) the allowable time allocated for each of the anomaly-related autonomous vehicles. Then, the disclosed technology sequentially transmits, to an instruction operator, information items about the transmitted initial travel instructions for the respective anomaly-related autonomous vehicles in the priority order among the anomaly-related autonomous vehicles.

Additionally, the disclosed technology determines, through the instruction operator, whether the initial travel instructions transmitted to the respective anomaly-related autonomous vehicles need be changed Then, upon determination, through the instruction operator, that the initial travel instruction for a selected one of the anomaly-related autonomous vehicles need be changed, the disclosed technology transmits, to the selected anomaly-related autonomous vehicle, a changed travel instruction.

SUMMARY OF THE INVENTION

Conventional technologies, which include the technology disclosed in the patent publication, are predicated on the fact that a terminal, such as the monitoring terminal operable by the monitoring operator, are configured to manipulate and/or check the information items respectively sent from all the autonomous vehicles.

As described above, the disclosed technology is configured to (i) set the priority order among the anomaly-related autonomous vehicles after transmitting the initial travel instructions, and (ii) determine whether the initial travel instructions transmitted to the respective anomaly-related autonomous vehicles need be changed. This configuration of the disclosed technology may delay transmission of the initial travel instructions to the respective anomaly-related autonomous vehicles when the number of information items sent from all the respective autonomous vehicles exceeds a predetermined limit value determined based on the processing capacity of the monitoring terminal. This delay of transmission of the initial travel instructions to the respective anomaly-related autonomous vehicles may constitute a hinderance to autonomous traveling of each anomaly-related autonomous vehicle.

The present disclosure therefore aims to provide travel assist systems, travel assist methods, and travel-assist control programs, each of which is capable of transmitting, without delay, a travel instruction to each autonomous vehicle that has sent, thereto, a travel-instruction request for anomaly avoidance.

A first exemplary measure of the present disclosure provides a travel assist system for assisting traveling of at least one autonomous vehicle in response to at least one assistance request sent from the at least one autonomous vehicle.

The travel assist system according to the first exemplary measure includes a plurality of terminals, each of which has a first function and a second function. The first function of each of the terminals generates, based on input information entered by at least one of first operators belonging to a first group, instruction information related to traveling of the at least one autonomous vehicle. The second function of each of the terminals reports, based on input information entered by at least one of second operators belonging to a second group, information representing a working situation of each of the first operators belonging to the first group.

The travel assist system according to the first exemplary measure includes a travel assist control unit configured to selectively perform an off-peak task upon receiving the at least one assistance request during an off-peak situation where there are a predetermined number of free operators included in the first group. The off-peak task is configured to assign the at least one assistance request to a selected one of the free operators included in the first group.

The travel assist control unit is configured to selectively perform an on-peak task upon receiving the at least one assistance request during an on-peak situation where there are not the predetermined number of the free operators included in the first group. The on-peak task is configured to analyze assignment of the at least one assistance request to a selected one of the second operators included in the second group in accordance with a priority level of the at least one assistance request.

A second exemplary measure of the present disclosure provides a travel assist system for assisting traveling of at least one autonomous vehicle in response to at least one assistance request sent from the at least one autonomous vehicle.

The travel assist system according to the second exemplary measure includes a plurality of instruction terminals, each of which is configured to perform an instruction function of generating instruction information in response to the at least one assistance request.

The travel assist system according to the second exemplary measure includes at least one management terminal configured to perform the instruction function, and manage an operating condition of each of the plurality of instruction terminals.

The travel assist system according to the second exemplary measure includes a travel assist control unit configured to selectively perform an off-peak task and an on-peak task in accordance with the operating condition of each of the plurality of instruction terminals.

The off-peak task is configured to, upon receiving the at least one assistance request during an off-peak situation where there are a predetermined number of free terminals included in the plurality of instruction terminals, assign the at least one assistance request to a selected one of the free terminals included in the plurality of instruction terminals.

The on-peak task is configured to, upon receiving the at least one assistance request during an on-peak situation where there are not the predetermined number of the free terminals included in the plurality of instruction terminals, analyze assignment of the at least one assistance request to the at least one management terminal in accordance with at least a priority level of the at least one assistance request.

A third exemplary measure of the present disclosure provides a method of assisting traveling of at least one autonomous vehicle in response to at least one assistance request sent from the at least one autonomous vehicle in a system including a plurality of terminals, each of which has a first function and a second function. The first function of each of the terminals generates, based on input information entered by at least one of first operators belonging to a first group, instruction information related to traveling of the at least one autonomous vehicle. The second function of each of the terminals reports, based on input information entered by at least one of second operators belonging to a second group, information representing a working situation of each of the first operators belonging to the first group.

The Method Includes (I) Performing, upon receiving the at least one assistance request during an off-peak situation where there are a predetermined number of free operators included in the first group, an off-peak task of assigning the at least one assistance request to a selected one of the free operators included in the first group (II) Performing, upon receiving the at least one assistance request during an on-peak situation where there are not the predetermined number of the free operators included in the first group, an on-peak task of analyzing assignment of the at least one assistance request to a selected one of the second operators included in the second group in accordance with a priority level of the at least one assistance request A fourth exemplary measure of the present disclosure provides a method of assisting traveling of at least one autonomous vehicle in response to at least one assistance request sent from the at least one autonomous vehicle in a system including (i) a plurality of instruction terminals, each of which is configured to perform an instruction function of generating instruction information in response to the at least one assistance request, and (ii) at least one management terminal configured to perform the instruction function, and manage an operating condition of each of the plurality of instruction terminals.

The Method Includes (I) Performing, upon receiving the at least one assistance request during an off-peak situation where there are a predetermined number of free terminals included in the plurality of instruction terminals, an off-peak task of assigning the at least one assistance request to a selected one of the free terminals included in the plurality of instruction terminals (II) Performing, upon receiving the at least one assistance request during an on-peak situation where there are not the predetermined number of the free terminals included in the plurality of instruction terminals, an on-peak task of analyzing assignment of the at least one assistance request to the at least one management terminal in accordance with at least a priority level of the at least one assistance request A fifth exemplary measure of the present disclosure provides a program product for a computer, the program product including a non-transitory computer-readable medium, and a set of computer program instructions embedded in the computer-readable medium, the instructions causing the computer to serve as the travel assist control unit according to the first exemplary measure.

The present disclosure makes it possible to transmit, without delay, a travel instruction to each autonomous vehicle that has sent, thereto, a travel-instruction request for anomaly avoidance.

BRIEF DESCRIPTION OF THE DRAWINGS

The above object, other objects, characteristics, and advantageous benefits of the present disclosure will become apparent from the following description with reference to the accompanying drawings in which:

FIG. 6 is a flowchart illustrating a travel-assist control routine of the travel assist system according to the first embodiment;

FIG. 12 is a flowchart illustrating an operator-assignment control subroutine of step S176 of FIG. 6 during the on-peak situation according to the sixth embodiment;

FIG. 13 is a flowchart illustrating an operator-assignment control subroutine of step S176 of FIG. 6 during the on-peak situation according to the seventh embodiment;

FIG. 14 is a flowchart illustrating an operator-assignment control subroutine of step S176 of FIG. 6 during the on-peak situation according to the eighth embodiment;

FIG. 16 is a flowchart illustrating a travel-assist control routine of the travel assist system according to the ninth embodiment.

DETAILED DESCRIPTION

First Embodiment

Figure 1:
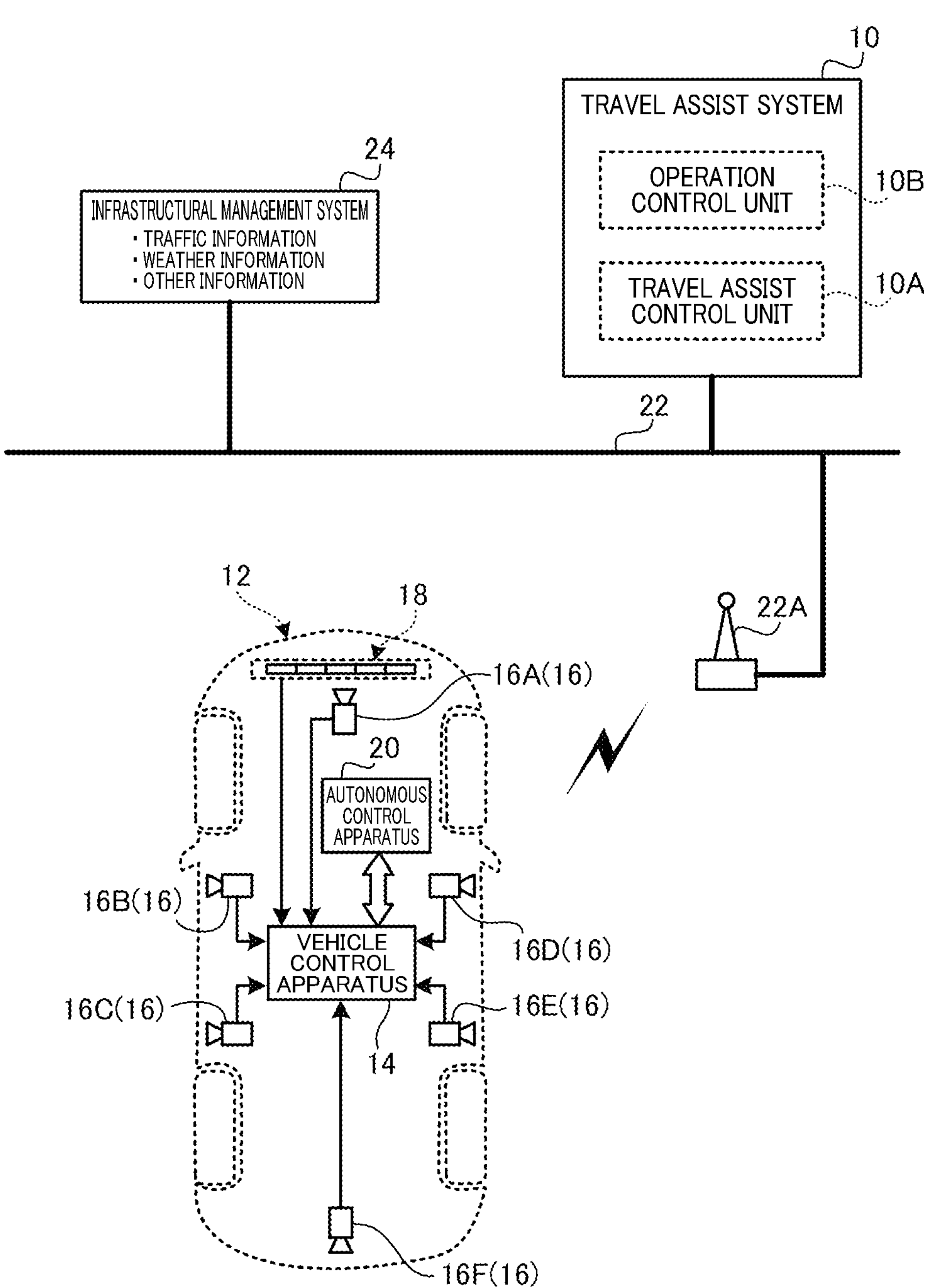
FIG. 1 is a schematic diagram illustrating a travel assist system that includes a travel assist control unit for assisting traveling of a vehicle that operates in an autonomous driving mode according to the first embodiment.

FIG. 1 illustrates a network diagram illustrating that a travel assist system 10 according to the first embodiment performs travel assistance of each autonomous vehicle 12 that is autonomously driving.

Each autonomous vehicle, described simply each vehicle, 12 includes a vehicle control apparatus 14 and an autonomous-driving control apparatus 20 installed therein. The vehicle control apparatus 14 mainly serves as an autonomous-driving controller, and also serves as a storage for storing information required for traveling assistance.

Each vehicle 12 includes a drive system equipped with an engine and an electrical system equipped with sensors, each of which monitors a condition of a predetermined portion of the corresponding vehicle 12. The vehicle control apparatus 14 of each vehicle 12 is configured to perform (i) control of the drive system, i.e., the engine, and (ii) failure diagnosis in each predetermined portion of the corresponding vehicle 12.

A plurality of cameras, which include, for example, a front camera 16A, a left-front camera 16B, a left-rear camera 16C, a right-front camera 16D, a right-rear camera 16E, and a rear camera 16F, are provided in each vehicle 12 (see FIG. 1). The front camera 16A, left-front camera 16B, left-rear camera 16C, right-front camera 16D, right-rear camera 16E, and rear camera 16F, which are collectively called cameras 16, are each configured to capture a corresponding region around the corresponding vehicle 12. The cameras 16 are connected to the vehicle control apparatus 14.

A plurality of millimetre-wave radars and LIDARs, which are collectively called radars 18, are provided in each vehicle 12 (see FIG. 1). The radars 16 are connected to the vehicle control apparatus 14.

The autonomous control apparatus 20 is configured to determine autonomous driving operations to a predetermined destination in accordance with information items received from the vehicle control apparatus 14; these information items include, for example, measurement information items measured by the cameras 16 and radars 18 and are required for the autonomous driving operations.

The autonomous control apparatus 20 is additionally configured to instruct the vehicle control apparatus 14 to perform the autonomous driving operations.

The autonomous control apparatus 20 is communicably connected to the travel assist system 10 through a radio communication device 22A of a network 22.

An information item representing a traveling history of each vehicle 12 based on autonomous driving by the corresponding vehicle 12 is outputted to the travel assist system 10, so that the information items, i.e., travel-history information items, of the respective vehicles 12 are aggregated in the travel assist system 10.

Figure 2:
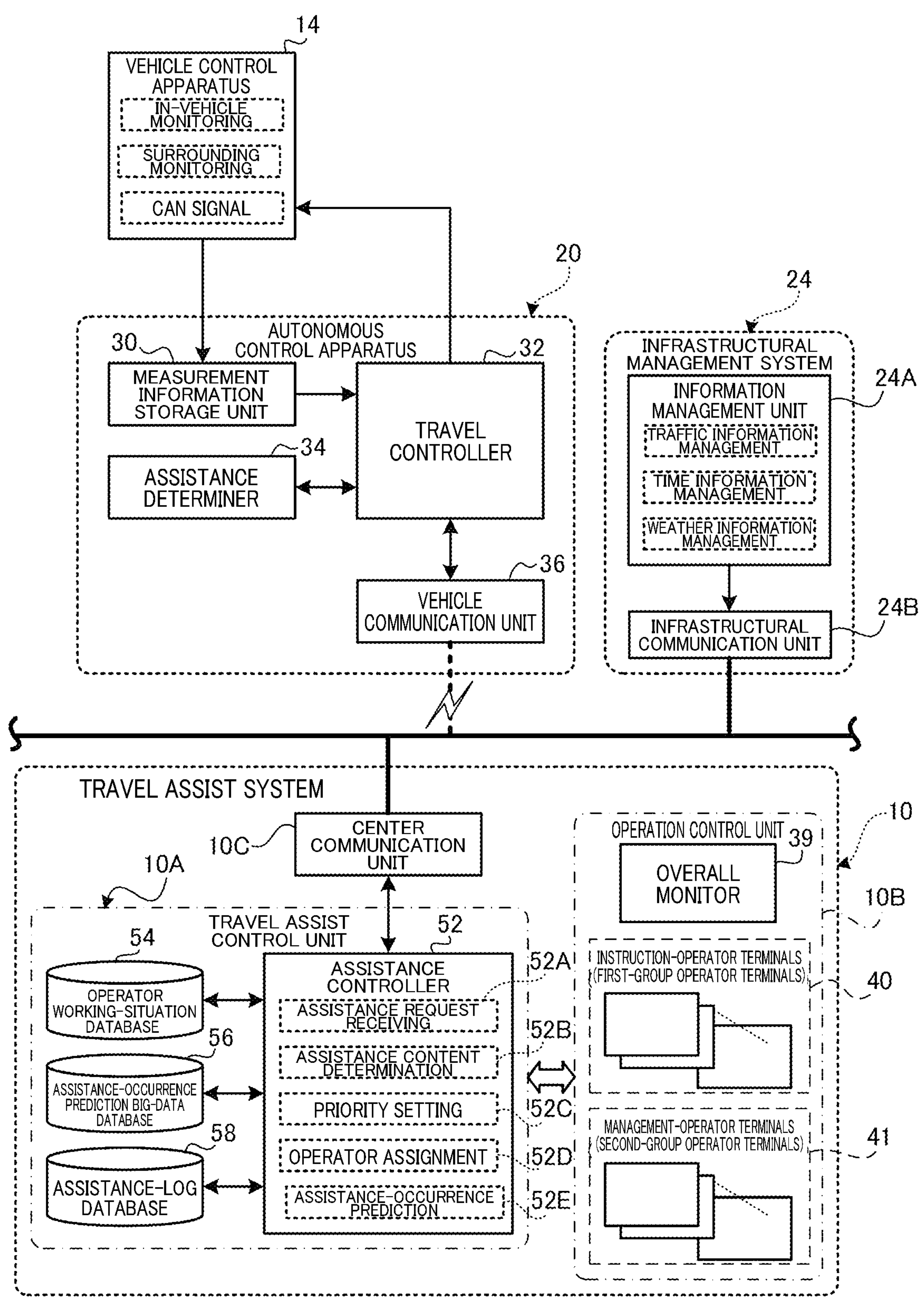
FIG. 2 is a functional block diagram illustrating a functional configuration of an autonomous control apparatus and a functional configuration of the travel assist system for transmission and/or reception of information items between the vehicle assist system and the autonomous control apparatus according to the first embodiment.

The travel assist system 10 includes, as illustrated in FIG. 2, a plurality of terminals that are categorized into instruction-operator terminals 40 serving as instruction terminals, and management-operator terminals 41 serving as management terminals. The travel assist system 10 is configured such that the instruction-operator terminals 40 or the management-operator terminals 41 perform travel-assistance instructions.

An infrastructural management system 24 is connected to the network 22.

FIG. 2 is a functional block diagram illustrating a functional configuration of the autonomous control apparatus 20 of each vehicle 12 and a functional configuration of the travel assist system 10. The functional configuration of the autonomous control apparatus 20 of each vehicle 12 performs transmission and/or reception of information items with respect to the vehicle assist system 10 and the infrastructural management system 24; the information items are related to an assistance request transmitted from the corresponding vehicle 12 to the vehicle assist system 10.

Similarly, the functional configuration of the travel assist system 10 performs transmission and/or reception of information items with respect to the autonomous control apparatus 20 of each vehicle 12 and the infrastructural management system 24; the information items are related to the assistance request transmitted from the corresponding vehicle 12 to the vehicle assist system 10.

The functional diagram is an example of various functional diagrams. Various types of functions and/or various combinations of functions can be used to constitute the functional configuration of the travel assist system 10 and the functional configuration of the autonomous control apparatus 20 of each vehicle 12 as long as the various types of functions and/or various combinations of functions can achieve one or more objects of the present disclosure.

Some or all of the functions illustrated in FIG. 2 can be implemented by means of software, such as microcomputer's execution of one or more programs.

Infrastructural Management System 24

The infrastructural management system 24 includes, as illustrated in FIG. 2, an information management unit 24A and an infrastructural communication unit 24B. The information management unit 24A obtains and manages real-time traffic information items, weather information items, and time information items. Each of the time information items represents an obtained time of a corresponding one of the traffic information items and the weather information items.

The infrastructural communication unit 24B is configured to retrieve, from the information management unit 24A, one or more of the information items managed in the information management unit 24A when necessity arises.

Autonomous Control Apparatus 20

The autonomous control apparatus 20 of each vehicle 12 includes, as illustrated in FIG. 2, a measurement information storage unit 30. The measurement information items measured by the cameras 16 and radars 18 are inputted to the measurement information storage unit 30, and stored therein. Diagnostic codes, in other words, controller-area network (CAN) diagnostic signals, are inputted to the measurement information storage unit 30, and stored therein.

The autonomous control apparatus 20 of each vehicle 12 includes a travel controller 32 connected to the measurement information storage unit 30. The travel controller 32 is configured to retrieve, from the measurement information storage unit 30, necessity ones of the measurement information items stored in the measurement information storage unit 30.

The autonomous control apparatus 20 of each vehicle 12 includes a vehicle communication unit 36. The travel controller 32 of the autonomous control apparatus 20 of each vehicle 12 is configured to control, based on a predetermined travel plan, the autonomous driving of the corresponding vehicle 12. Additionally, the travel controller 32 of the autonomous control apparatus 20 of each vehicle 12 is configured to send, to the travel assist system 10, an assistance request, i.e., a travel-assistance request, through the vehicle communication unit 36. After sending of the travel-assistance request, the travel controller 32 of the autonomous control apparatus 20 of each vehicle 12 is configured to obtain, from the travel assist system 10, travel-assistance information as a response to the travel assist request.

The autonomous control apparatus 20 of each vehicle 12 includes an assistance determiner 34 connected to the travel controller 32.

Specifically, the assistance determiner 34 of the autonomous control apparatus 20 of each vehicle 12 is configured to determine whether to send the travel assistance request to the travel assist system 10 in accordance with how the autonomous driving of the corresponding vehicle is carried out.

The travel controller 32 of the autonomous control apparatus 20 of each vehicle 12 is configured to send, to the travel assist system 10, the assistance request through the vehicle communication unit 36 upon determination that the assistance determiner 34 determines to send the assistance request to the travel assist system 10.

Travel assist system 10

The travel assist system 10 is installed in a so-called autonomous driving center, and is required for operators including instruction operators OP and management operators OP to the management of the vehicles 12.

Specifically, the travel assist system 10 includes a travel assist control unit 10A, an operation control unit 10B, and a central communication unit 10C. The travel assist control unit 10A is comprised of, for example, a central processing unit (CPU), a rewritable non-volatile memory, and other peripheral devices. The non-volatile memory stores a travel-assist control program described later, and the CPU is configured to load the travel-assist control program from the non-volatile memory, and execute the travel-assist control program.

The central communication unit 10C is configured to perform transmission and reception of various information items with respect to (i) the travel controller 32 of each vehicle 12 through the vehicle communication unit 36 and (ii) the information management unit 24A of the infrastructural management system 24 through the infrastructural communication unit 24B.

The travel assist control unit 10A includes an assistance controller 52. The assistance controller 52 is configured to perform various tasks based on the various information items received by the central communication unit 10C.

While one vehicle 12, which will be referred to as a target vehicle 12, included in the vehicles 12 is traveling, if an event, which constitutes a hindrance to the autonomous traveling of the target vehicle 12, has occurred in or around the target vehicle 12, the target vehicle 12 sends, to the travel assist system 10, an assistance request, such as a travel assist request. In response to receiving the travel assistance request, the travel assist system 10 instructs at least one of the instruction terminals 40 and the management terminals 41, which monitor each vehicle 12, to perform proper travel assistance of the target vehicle 12, making it possible for the target vehicle 12 to continue autonomous traveling despite the occurrence of the event constituting a hindrance to the autonomous traveling of the target vehicle 1.

Figure 3:
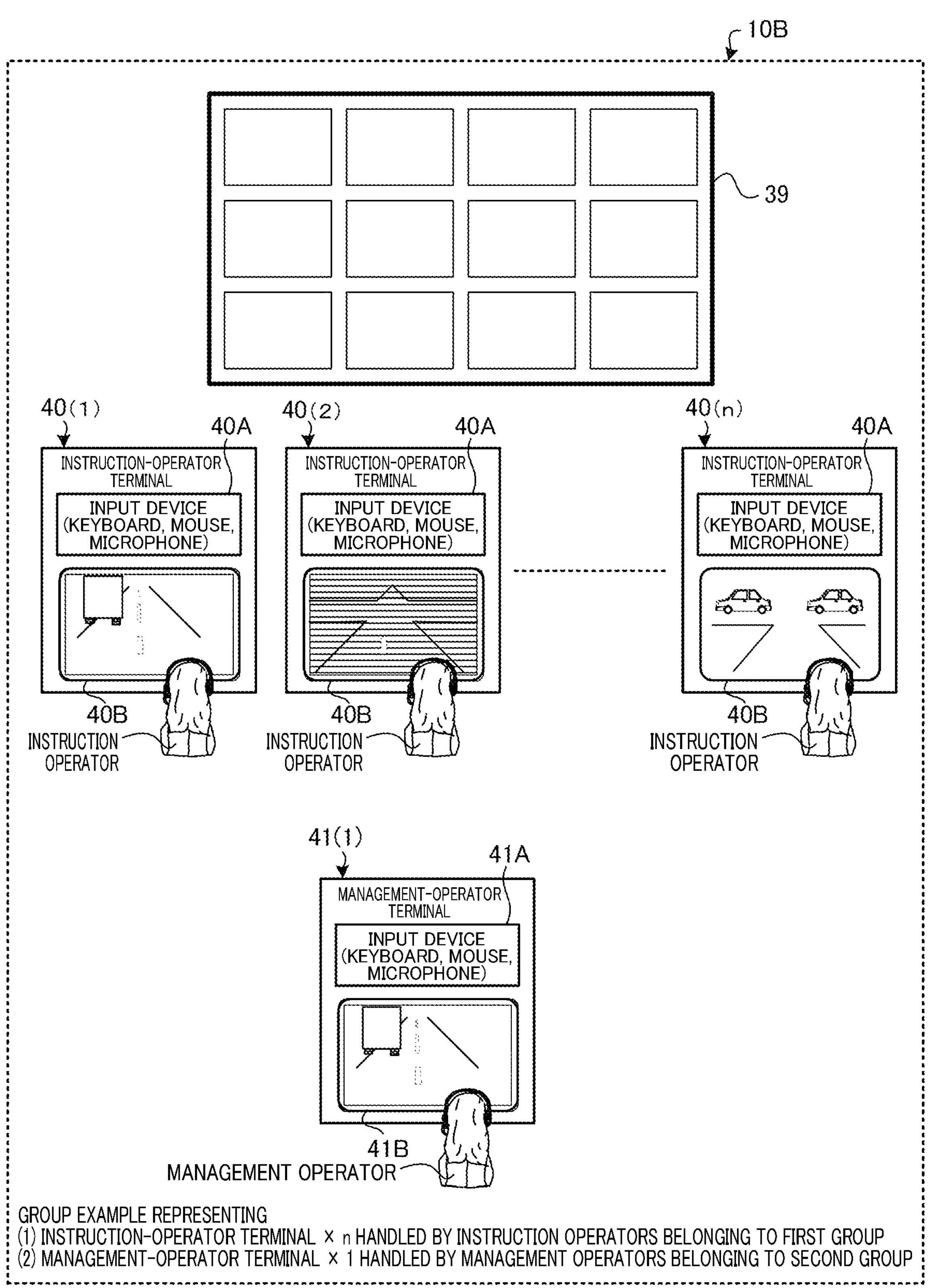
FIG. 3 is a schematic diagram illustrating an operation control unit provided in the travel assist system according to the first embodiment.

Referring to FIG. 3, the operation control unit 10B includes an overall monitor 39, the instruction-operator terminals 40, and management-operator terminals 41.

The overall monitor 39 has a split screen, and is configured to display, on plural screen areas, plural assist-request related images, respectively.

Each of the instruction-operator terminals 40 includes an input device 40A comprised of, for example, a keyboard and a mouse, and an output device 40B comprised of a monitor and a printer. Similarly, each of the management-operator terminals 41 includes an input device 41A comprised of, for example, a keyboard and a mouse, and an output device 41B comprised of a monitor and a printer.

Instruction operators OP log in to the respective instruction-operator terminals 40, and management operators OP also log in to the respective management-operator terminals 41. Each instruction operator OP is able to enter information related to travel assistance using the input device 40A in accordance with information outputted by the output device 40B. Similarly, each management operator OP is able to enter information related to travel assistance using the input device 41A in accordance with information outputted by the output device 41B.

The instruction operators OP, who use the respective instruction-operator terminals 40, belong to a first group according to the first embodiment. Each of the instruction-operator terminals 40 has a main function, i.e., a first function, of addressing assistance requests sent from at least one of the vehicles 12. Specifically, when an assistance request sent from one of the vehicles 12 is inputted to any of the instruction-operator terminals 40, the first function of the corresponding instruction-operator terminal 40 generates, based on information related to the assistance request and entered by the corresponding instruction operator OP, instruction information that addresses the assistance request.

The management operators OP, who use the respective management-operator terminals 41, belong to a second group according to the first embodiment. Each of the management-operator terminals 41 has a main function, i.e., a second function, of accessing an operator working-situation database 54 described later to accordingly report information representing the working situation of each instruction-operator terminal 40, i.e., each instruction operator OR Each operator terminal 41 can serve to perform the first function if necessity arises.

In a default setting of the operation control unit 10B, a predetermined number (n) of the instruction-operator terminals 40 are allocated for each management-operator terminal 41. The instruction-operator terminals 40 allocated for each management-operator terminal 41 will be referred to as 40(1) to 40(*n*).

That is, the operation control unit 10B provides plural sets, each of which is comprised of the corresponding management-operator terminal 41 and the instruction-operator terminals 40(1) to 40(*n*) allocated therefor. FIG. 3 for example illustrates one set comprised of the management-operator terminal 41, which is illustrated as 41(1) in FIG. 3, and the instruction-operator terminals 40(1) to 40(*n*).

As described above, all the operators OP, who use the instruction-operator terminals 40 and the management-operator terminals 41, are categorized into the first group and the second group, so that each operator OP has a fixed function allocated thereby. In other words, when any operator OP logs in to the corresponding terminal 40 or 41 to use it, the function allocated by the corresponding operator OP is fixed.

The following shows, for each terminal, the correlation among (i) the corresponding function, (ii) the description of the corresponding function, and (iii) the corresponding name as TABLE 1.

The term "reporting information representing the working situation of each instruction-operator terminal 40, i.e., each instruction operator OP," means a function of (I) Checking how the corresponding instruction operator OP works using the corresponding instruction-operator terminal 40 to accordingly monitor whether the corresponding instruction operator OP offers travel-assistance services without any trouble in accordance with predetermined monitoring items (II) Report a result of the monitoring as information representing the working situation of the corresponding instruction-operator terminal 40, i.e., the corresponding instruction operator OP The monitoring items for each instruction operator OP, i.e., for each instruction-operator terminal 40, can include the following:

(1) The first monitoring item is the condition of the corresponding instruction operator OP (2) The second monitoring item is checking of whether one or more components included in the overall system 10, which are required to offer the travel-assistance services, are functioning normally (3) The third monitoring item is how the corresponding instruction operator OP (the corresponding instruction-operator terminal 40) manages the operator's working schedule (4) The fourth monitoring item is how the corresponding instruction operator OP (the corresponding instruction-operator terminal 40) manages the travel plan of each vehicle 12

Each management-operator terminal 41 performs the second function of reporting information representing the working situation of the corresponding instruction-operator terminal 40, i.e., the corresponding instruction operator OR The above monitoring items are selectable, and one or more of the monitoring items can be selected. Additional monitoring items can be used.

The following describes a travel-assist control task according to the first embodiment assuming that all the terminals included in the operation control unit 10B are categorized beforehand into the instruction-operator terminals 40 and the management-operator terminals 41, so that the instruction operators OP log in to the respective instruction-operator terminals 40 to operate them, and the management operators OP log in to the respective management-operator terminals 41 to operate them. This results in the travel-assist control task being carried out mainly through the instruction-operator terminals 40 and the management-operator terminals 41. Each of the second to eighth embodiment described later is based on the same assumption as stated above.

TABLE 1

| | FUNCTION (*1) | DESCRIPTION OF FUNCTION | NAME: CLAIM | NAME: EMBODIMENT |
|---|---|---|---|---|
| TERMINAL | FIRST FUNCTION | GENERATE INSTRUCTION INFORMATION ADDRESSING ASSISTANCE REQUEST BASED ON OPERATOR'S ENTERED INFORMATION | INSTRUCTION TERMINAL | INSTRUCTION-OPERATOR TERMINAL |
| | SECOND FUNCTION | REPORT INFORMATION REPRESENTING WORKING SITUATION OF EACH INSTRUCTION-OPERATOR TERMINAL (EACH INSTRUCTION OPERATOR) DETERMINE PRIORITY IF REQUIRED | MANAGEMENT TERMINAL | MANAGEMENT-OPERATOR TERMINAL |

(*1) FUNCTION OF EACH TERMINAL IS DETERMINED BASED ON CRITERIA SET BY LOGGED-IN OPERATOR

Next, the following describes, in detail, how each management-operator terminal 41 reports information representing the working situation of each instruction-operator terminal 40, i.e., each instruction operator OP, which is included in the second function.

Figure 15:
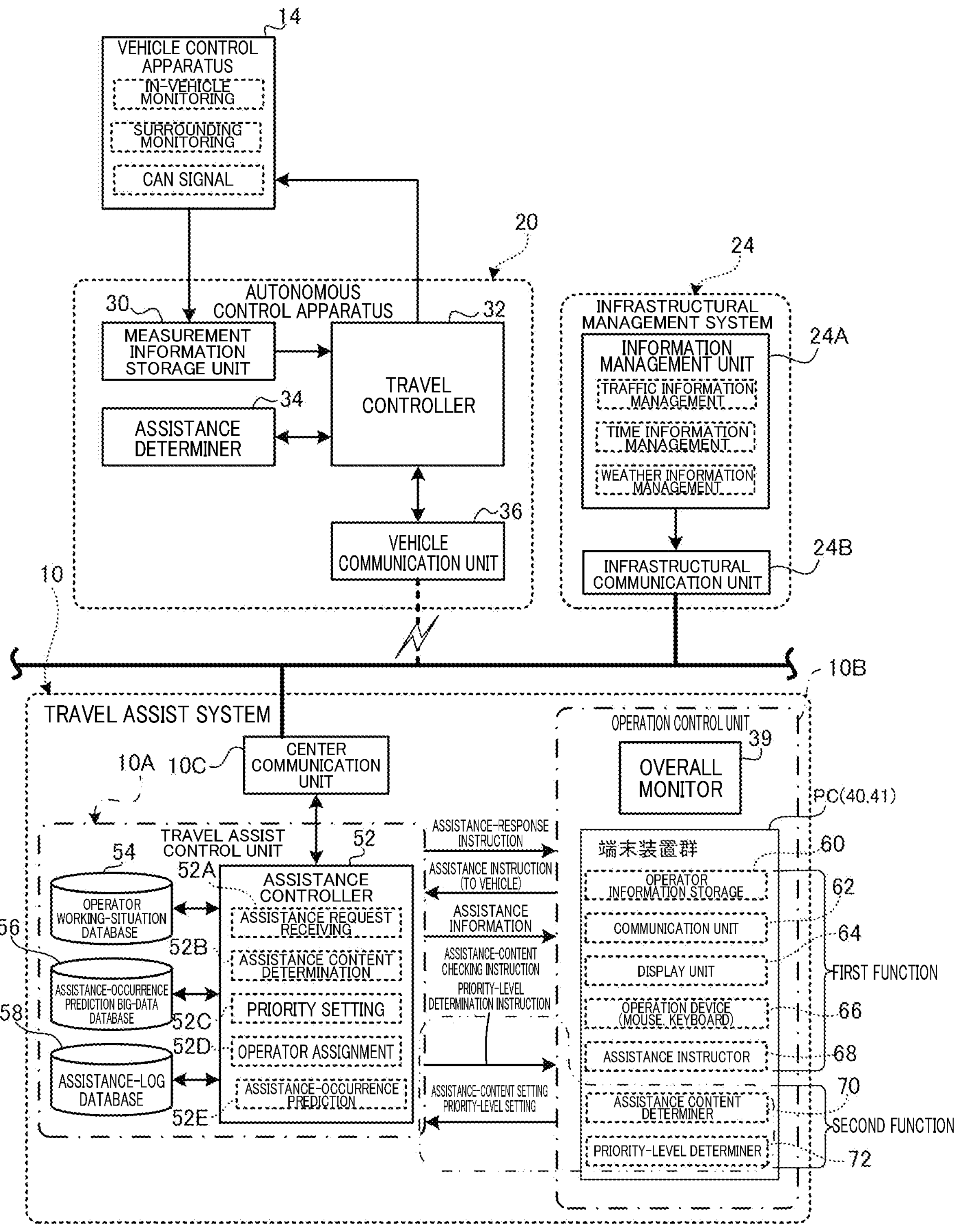
FIG. 15 is a functional block diagram illustrating a functional configuration of an autonomous control apparatus and a functional configuration of a travel assist system for transmission and/or reception of information items between the vehicle assist system and the autonomous control apparatus according to the ninth embodiment.

In contrast, a travel-assist control task according to the ninth embodiment is carried out assuming that all the terminals included in the operation control unit 10B are not categorized beforehand into the instruction-operator terminals 40 and the management-operator terminals 41 (see FIGS. 14 and 15).

Referring to FIG. 2, the central communication unit 10C retrieves, from each vehicle 12, information items on the autonomous traveling of the corresponding vehicle 12 through the vehicle communication unit 36. Then, the central communication unit 10C transmits, to the assistance controller 52, the retrieved information items, i.e., the retrieved autonomous-related information items.

The central communication unit 10C also retrieves, from the information management unit 24A, the real-time traffic information items, the weather information items, and the time information items through the infrastructural communication unit 24B. Each of the time information items represents an obtained time of a corresponding one of the traffic information items and the weather information items. Then, the central communication unit 10C transmits, to the assistance controller 52, the retrieved information items, i.e., the retrieved infrastructural-related information items.

The assistance controller 52 includes an assistance request receiving function 52A, an assistance content determination function 52B, a priority setting function 52C, an operator assignment function 52D, and an assistance-occurrence prediction function 52E.

The assistance request receiving function 52A receives assistance requests, i.e., travel assistance requests, from some or all of the vehicles 12, which will be referred to as assistance-request vehicles 12, and also receives the autonomous-related information items sent from each of the assistance-request vehicles 12 together with the travel assistance request of the corresponding one of the assistance-request vehicles 12. Then, the assistance request receiving function 52A analyses the situation of and around each assistance-request vehicle 12 in accordance with the autonomous-related information items about the corresponding assistance-request vehicle 12.

The assistance content determination function 52B determines, based on the analysis result of the situation of and around each assistance-request vehicle 12, the content of the assistance request sent from the corresponding assistance-request vehicle 12 to accordingly determine any of predetermined assistance-content categories to which the content of the assistance request from each assistance-request vehicle 12 belongs. The predetermined assistance categories can include, for example, (i) a start-problem assistance category, (ii) a safety-confirmation assistance category, (iii) a traffic-accident assistance category, and (iv) an unspecified assistance category.

The priority setting function 52C sets, based on the contents, i.e., the assistance-content categories, of the assistance requests from the respective assistance-request vehicles 12, priority for the assistance requests from the respective assistance-request vehicles 12.

For example, the priority setting function 52C quantifies the priority for the assistance requests from the respective assistance-request vehicles 12 to accordingly set (i) a selected one of the assistance requests to the first lowest priority level, for example, level 1, (ii) a selected one of the remaining assistance requests to the second lowest priority level, for example, level 2, . . . , (iii) a selected one, i.e., the last one, of the remaining assistance requests to the last lowest, i.e., the highest, priority level, such as level 10, thus classifying each of the assistance requests into any one of the levels 1 to 10. The number of priority levels can be changed to any value. If the priority for the assistance requests cannot be set depending on the content of at least one of the assistance requests, the priority for the assistance requests can be set by the management-operator terminals 41, i.e., operations of the management-operator terminals 41 by the management operators OP.

The operator assignment function 52D assigns the assistance requests to the operators OP in accordance with first information about a current working situation of each instruction operator terminal 40 and second information about a current working situation of each management operator terminal 41.

In other words, because each instruction operator OP logs in to the corresponding instruction operator terminal 40 in a one-to-one relationship and each management operator OP logs in to the corresponding management operator terminal 41 in a one-to-one relationship, the operator assignment function 52D assigns each of the assistance requests to a corresponding one of the instruction operators OP and the management operators OR The assistance-occurrence prediction function 52E performs mechanical learning based on AI technology in accordance with big data including, for example, historical data of past occurrences of the assistance requests to accordingly predict future occurrences of assistance requests.

The travel assist control unit 10A includes an operator working-situation database 54, an assistance-occurrence prediction big-data database 56, and an assistance-log database 58; these databases 54, 56, and 58 are connected to the assistance controller 52. Each of the functions 52A to 52E of the assistance controller 52 is configured to transmit and/or receive necessary information items to and/or from each of the databases 54, 56, and 58.

Figures 4A, 4B:
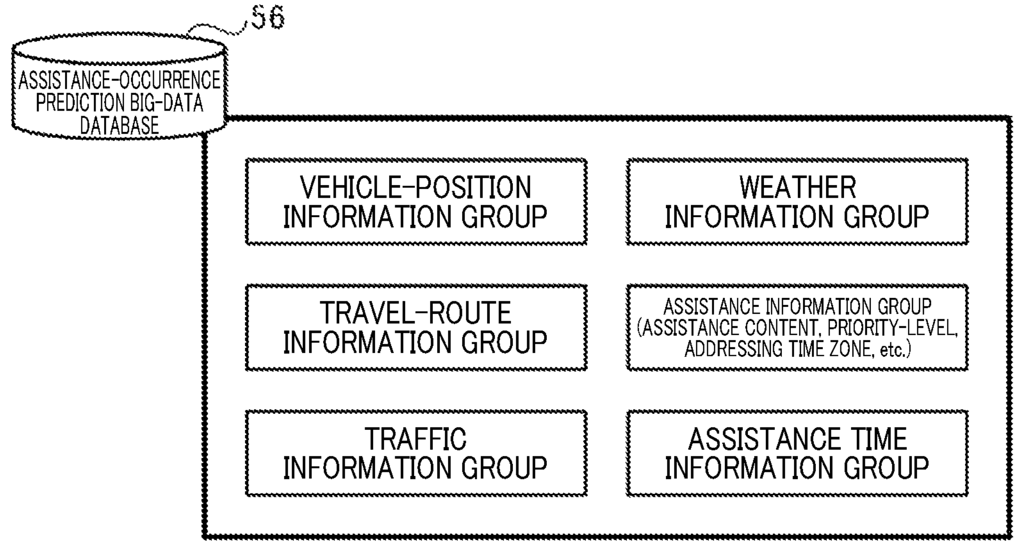
FIG. 4A is a schematic diagram illustrating the details of an operator-working situation database included in the travel assist system according to the first embodiment.
FIG. 4B is a schematic diagram illustrating the details of an assistance-occurrence prediction database included in the travel assist system according to the first embodiment.
Figures 4C, 5:
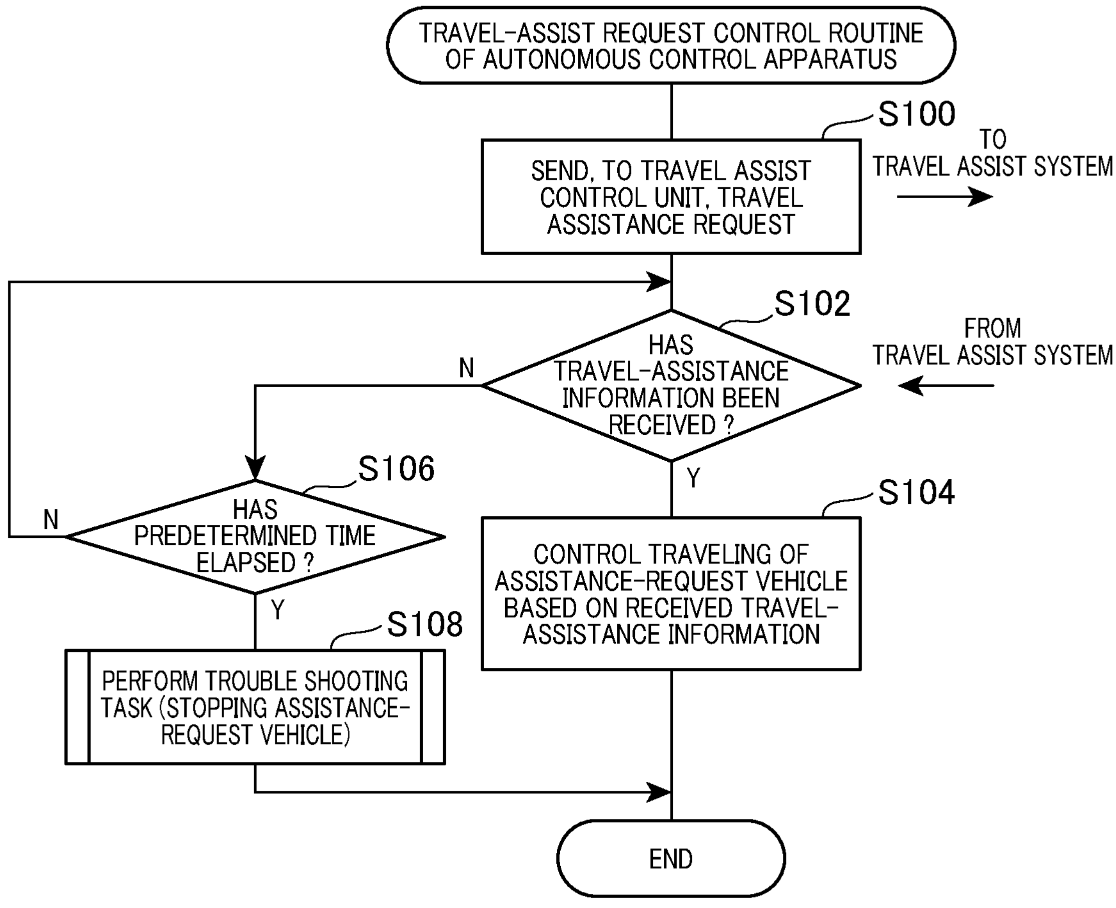
FIG. 4C is a schematic diagram illustrating the details of an assistance-log database included in the travel assist system according to the first embodiment.
FIG. 5 is a flowchart illustrating a travel-assist request control routine of the autonomous control apparatus according to the first embodiment.

The following describes the operator working-situation database 54, the assistance-occurrence prediction big-data database 56, and the assistance-log database 58 respectively illustrated in FIGS. 4A, 4B, and 4C.

As illustrated in FIG. 4A, the operator working-situation database 54 is comprised of a plurality of data records for all the respective operators OP, each of the data records for the corresponding operator OP is comprised of (i) an identifier (ID) of the corresponding operator OP for identifying the corresponding terminal 40 or 41, (ii) the type, such as the instruction or management, of the corresponding operator OP, and (iii) the current situation, such as a standby situation or a working situation, of the corresponding operator OR Each data item included in each data record can be freely updated by the assistance controller 52.

As illustrated in FIG. 4B, the assistance-occurrence prediction big-data database 56 is comprised of (I) A vehicle-position information group including past positions of the respective vehicles 12 as first big-data (II) A travel-route information group including past travel routes of the respective vehicles 12 as second big-data (III) A traffic information group including past traffic situations related to the traveling of each vehicle 12 as third big-data (IV) A weather information group including past weather conditions related to traveling of each vehicle 12 as fourth big-data (V) An assistance information group including information about assistances executed for each vehicle 12 in history as fifth big-data (VI) An assistance time information group including information indicative of a time length for each past assistance spent for execution of the corresponding past assistance as sixth big-data Each information item included in each information group can be freely updated by the assistance controller 52.

As illustrated in FIG. 4C, the assistance-log database 58 is comprised of a plurality of data records for logs of respective traveling assistances, i.e., the traveling assistance logs, each of the data records for the corresponding running assistance log is comprised of (I) A time of the occurrence of the corresponding assistance (II) A content of the corresponding assistance (III) A priority level of the corresponding assistance (IV) An ID of the corresponding operator OP (V) Elapsed time since the start of the corresponding assistance (VI) Target time required to complete with the corresponding assistance (VII) Predicted remaining time length for the corresponding assistance Each data item included in each data record can be freely updated by the assistance controller 52.

The operator assignment function 52D, which operates in a stable state, retrieves, in response to travel assistance requests sent from some vehicles 12, selected instruction-operator terminals 40 from the instruction-operator terminals 40 whose working situations are standby situations to accordingly assign the travel assistance requests to the respective retrieved instruction-operator terminals 40. Specifically, the operator assignment function 52D, which operates in the stable state, i.e., during an off-peak situation, can address the travel assistance requests received from the corresponding vehicles 12 as long as the number of received travel assistance requests is within a travel-assistance number predicted based on, for example, the historical data of the past occurrences of the assistance requests.

It is assumed that, depending on the traveling situations of the vehicles 12, the current weather condition, and/or the current time period, the number of travel assistance requests is larger than the number of the instruction-operator terminals 40.

In this case, the assistance controller 52 can queue the travel assistance requests received by the travel assist system 10, i.e., place the travel assistance requests received by the travel assist system 10 into a queue, in the received order, so that the assistance controller 52 waits for execution of the queued travel assistance requests.

The above configuration that the assistance controller 52 queues the travel assistance requests received by the travel assist system 10 in the received order may result in, even if one of the travel assistance requests has a very high priority level, i.e., requires an immediate travel assistance, the one of the travel assistance requests requiring a certain amount of standby time. Hereinafter, this situation will be referred to as an on-peak situation in the stable state.

From this viewpoint, the assistance controller 52 of the travel assist control unit 10A is configured to, if the on-peak situation in the stable state occurs, instruct a selected one of the management-operator terminals 41, each of which typically serves to manage the corresponding instruction-operator terminals 40, to address one or more assistance requests as long as the one or more assistance requests have a priority level higher than a predetermined threshold priority level. The one or more assistance requests that have a priority level higher than a predetermined threshold priority level will be referred to as one or more higher-priority assistance requests.

The predetermined threshold priority level used to determine whether one or more assistance requests are one or more higher-priority assistance requests can be freely determined. For example, assuming that assistance requests can be classified into any of the levels 1 to 10 (see FIG. 4C), level 8 can be set as the threshold priority level, so that one or more assistance requests, whose priority levels are higher than or equal to level 8, can be determined as one or more higher-priority assistance requests. Level 8, which is set as the priority level can be adjusted to another level in accordance with the frequency that the current situation comes down to the on-peak situation in the stable state.

Figure 7:
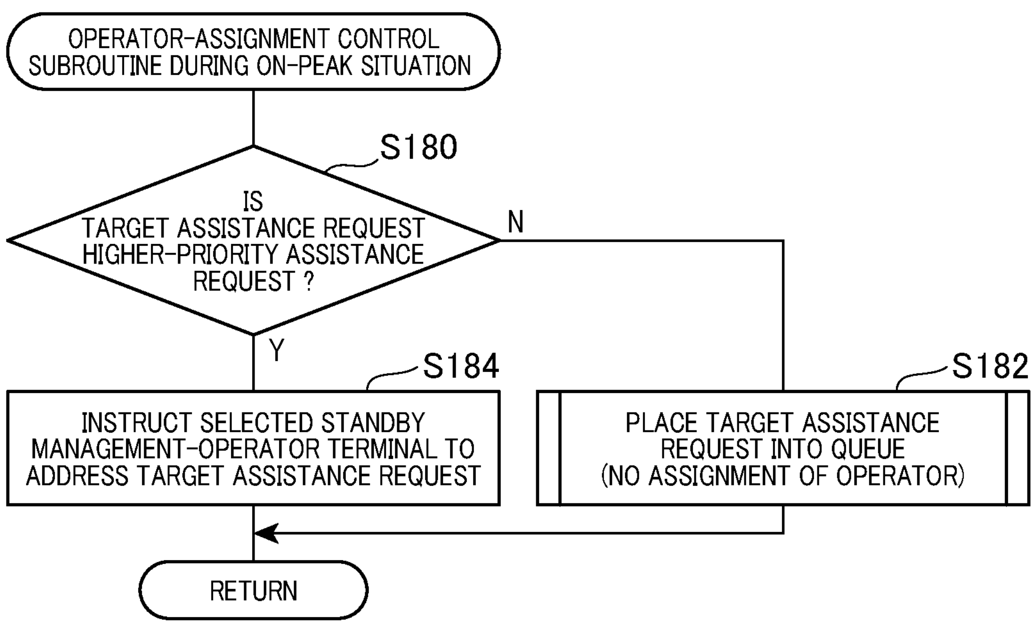
FIG. 7 is a flowchart illustrating an operator-assignment control subroutine of step S176 of FIG. 6 during an on-peak situation according to the first embodiment.

The following describes how the travel assist system 10 according to the first embodiment works with reference to the flowcharts of FIGS. 5 to 7.

Travel Assistance Request

The flowchart of FIG. 5 illustrates a travel-assist request control routine that is a subroutine of an autonomous travel control routine to be carried out by the autonomous control apparatus 20.

In step S100, the travel controller 32 of at least one vehicle 12, i.e., at least one assistance-request vehicle 12, sends, to the travel assist system 10, a travel assistance request. The travel assistance request is sent to the central communication unit 10C of the travel assist system 10 through the vehicle communication unit 36 of the at least one assistance-request vehicle 12.

In step S102, the travel controller 32 of the at least one assistance-request vehicle 12 determines whether the travel controller 32 has received travel-assistance information from the travel assist system 10.

In response to determination that the travel controller 32 has received the travel-assistance information from the travel assist system (YES in step S102), the travel controller 32 of the at least one assistance-request vehicle 12 controls traveling of the at least one assistance-request vehicle 12 in accordance with the received travel-assistance information in step S104, and thereafter terminates the travel-assist request control routine.

Otherwise, in response to determination that the travel controller 32 has not received the travel-assistance information from the travel assist system 10 (NO in step S102), the travel controller 32 of the at least one assistance-request vehicle 12 determines whether a predetermined period has elapsed since the sending of the travel assistance request in step S106.

In response to determination that the predetermined period has not elapsed since the sending of the travel assistance request (NO in step S106), the travel controller 32 of the at least one assistance-request vehicle 12 returns to step S102. Otherwise, in response to determination that the predetermined period has elapsed since the sending of the travel assistance request (YES in step S106), the travel-assist request control routine proceeds to step S108.

In step S108, the travel controller 32 of the at least one assistance-request vehicle 12 performs a predetermined troubleshooting task, such as a task of stopping the at least one assistance-request vehicle, and thereafter terminates the travel-assist request control routine.

Travel-assistance control

The flowchart of FIG. 6 illustrates a travel-assist control routine to be carried out by the travel assist system 10.

In step S150, the assistance controller 52 of the travel assist system 10 determines whether the assistance controller 52 has received at least one assistance request, i.e., at least one target assistance request, from at least one vehicle 12, i.e., at least one assistance-request vehicle 12. Specifically, the assistance controller 52 waits for the affirmative determination in step S150.

In response to determination that the assistance controller 52 has received the at least one target assistance request from the at least one assistance-request vehicle 12 (YES in step S150), the assistance controller 52 checks the content of the at least one target assistance request to accordingly store, in the assistance-log database 58, a traveling assistance log for the at least one target assistance request based on the content of the at least one target assistance request in step S152.

In step S152, the assistance controller 52 also performs a priority automatic setting task of automatically setting the priority level of the at least one target assistance request.

There are two cases. The first case is that the priority automatic setting task can be carried out, and the second case is that the priority automatic setting task cannot be carried out. From this viewpoint, the assistance controller 52 performs a task of determining whether the assistance controller 52 has succeeded or failed in executing the priority automatic setting task in step S154. Thereafter, the travel-assist control routine proceeds to step S156.

In step S156, the assistance controller 52 obtains, from, for example, the operator working-situation database 54, a free situation for each instruction-operator terminal 40; the free situation for each instruction-operator terminal 40 represents whether the corresponding instruction-operator terminal 40 is a free, i.e., an unassigned, instruction-operator terminal 40.

Next, in step S158, the assistance controller 52 determines, based on the free information obtained in step S156, whether there is at least one free (unassigned) instruction-operator terminal 40 whose working situation is the standby situation in step S158.

In response to determination that there is at least one free (unassigned) instruction-operator terminal 40 whose working situation is the standby situation (YES in step S158), the travel-assist control routine proceeds to step S160. In step S160, the assistance controller 52 instructs the at least one free, i.e., standby, instruction-operator terminal to address the at least one target assistance request. Thereafter, the travel-assist control routine proceeds to step S162.

In step S162, the assistance controller 52 determines, based on the determination result in step S154, whether the automatic setting task has been succeeded, and terminates the travel-assist control routine in response to determination that the automatic setting task has been succeeded.

Otherwise, in response to determination that the automatic setting task has been failed, the travel-assist control routine proceeds to step S164.

In step S164, the assistance controller 52 sets the priority level of the at least one target assistance request in accordance with any one of the first procedure and the second procedure, and thereafter, terminates the travel-assist control routine.

The first procedure is to manually set the priority level of the at least one target assistance request when at least one of the management-operator terminals 41 becomes unassigned.

The second procedure is configured such that the travel assist system 10 automatically sets the priority level of the at least one target assistance request based on the assistance situation of each of the instruction-operator terminals 40.

Otherwise, in response to determination that there are no free (unassigned) instruction-operator terminals 40, i.e., there are no standby instruction-operator terminals 40 (NO in step S158), the travel-assist control routine proceeds to step S166.

In step S166, the assistance controller 52 determines whether the priority level of the at least one target assistance request has been set. In response to determination that the priority level of the at least one target assistance request has not been set (NO in step S166), the travel-assist control routine proceeds to step S168.

In step S168, the assistance controller 52 determines whether there are one or more free (unassigned) management-operator terminals 41 whose working situations are the standby situations.

In response to determination that there are one or more free (standby) management-operator terminals 41 whose working situations are the standby situations (YES in step S168), the travel-assist control routine proceeds to step S170.

In step S170, the assistance controller 52 instructs the management operator OP of at least one standby management-operator terminal 41 to check the content of the at least one target assistance request, and thereafter instructs the management operator OP of at least one standby management-operator terminal 41 to manually set the priority level of the at least one target assistance request. Thereafter, the travel-assist control routine proceeds to step S172.

Otherwise, in response to determination that the priority level of the at least one target assistance request has been set (YES in step S166), the travel-assist control routine proceeds to step S172.

In step S172, the assistance controller 52 determines, again, whether there are one or more free (unassigned) management-operator terminals 41 whose working situations are the standby situations.

In response to determination that there are no free (unassigned) management-operator terminals 41, i.e., there are no standby management-operator terminals 41 (NO in step S172), the travel-assist control routine proceeds to step S174.

Additionally, in response to determination that there are no free (unassigned) management-operator terminals 41, i.e., there are no standby management-operator terminals 41 (NO in step S168), the travel-assist control routine proceeds to step S174.

In step S174, the assistance controller 52 queues the at least one target assistance request, i.e., places the at least one target assistance request, into a queue, and thereafter terminates the travel-assist control routine. That is, when the travel-assist control routine has reached step S174, assignment of the at least one travel assistance request to any of the operator terminals 40 and 41 is not carried out.

Otherwise, in response to determination that there are one or more free (unassigned) management-operator terminals 41, i.e., there are standby management-operator terminals 41 (YES in step S172), the travel-assist control routine proceeds to step S176.

In step S176, i.e., in response to determination that the on-peak situation in which there are no standby instruction-operator terminals 40 has occurred, the assistance controller 52 performs an operator-assignment control subroutine for assigning the at least one target assistance request to a selected one of the management-operator terminals 41 (see FIGS. 6 and 7).

The flowchart of FIG. 7 illustrates the operator-assignment control subroutine of step S176 of FIG. 6 during the on-peak situation to be carried out by the assistance controller 52.

Referring to FIG. 7, the assistance controller 52 determines whether the at least one target assistance request is a higher-priority assistance request having a priority level higher than or equal to the predetermined threshold priority level, such as the level 8 within the range from the level 1 to the level 10 (see FIG. 4C) in step S180.

In response to determination that the at least one target assistance request is not the higher-priority assistance request (NO in step S180), the assistance controller 52 determines that the at least one target assistance request is not a relatively urgent assistance request in step S182, and queues the at least one target assistance request, i.e., places the at least one target assistance request into a queue in step S182. Then, the assistance controller 52 terminates the operator-assignment control subroutine.

Otherwise, in response to determination that the at least one target assistance request is a higher-priority assistance request (YES in step S180), the assistance controller 52 determines that the at least one target assistance request is a relatively urgent assistance request in step S184, and instructs a selected at least one of the standby management-operator terminals 41 to address the at least one target assistance request in step S184. Then, the assistance controller 52 terminates the operator-assignment control subroutine.

Second Embodiment

The following describes the second embodiment of the present disclosure. In the first and second embodiments, descriptions of like parts between the first and second embodiments, to which like reference characters are assigned, are omitted.

The second embodiment has a specific feature that an operator-assignment control subroutine of the second embodiment in step S176 of FIG. 6 predicts, during the on-peak situation, a time period X for which new assistance requests after the at least one target assistance request will occur, and predicts the priority level of each of the new assistance requests. The predicted time period X and the predicted priority level of each of the new assistance requests constitute information $\alpha$. Then, the operator-assignment control routine of the second embodiment performs, based on the information $\alpha$, an operator-terminal assignment task for the at least one target assistance request.

Figure 8:
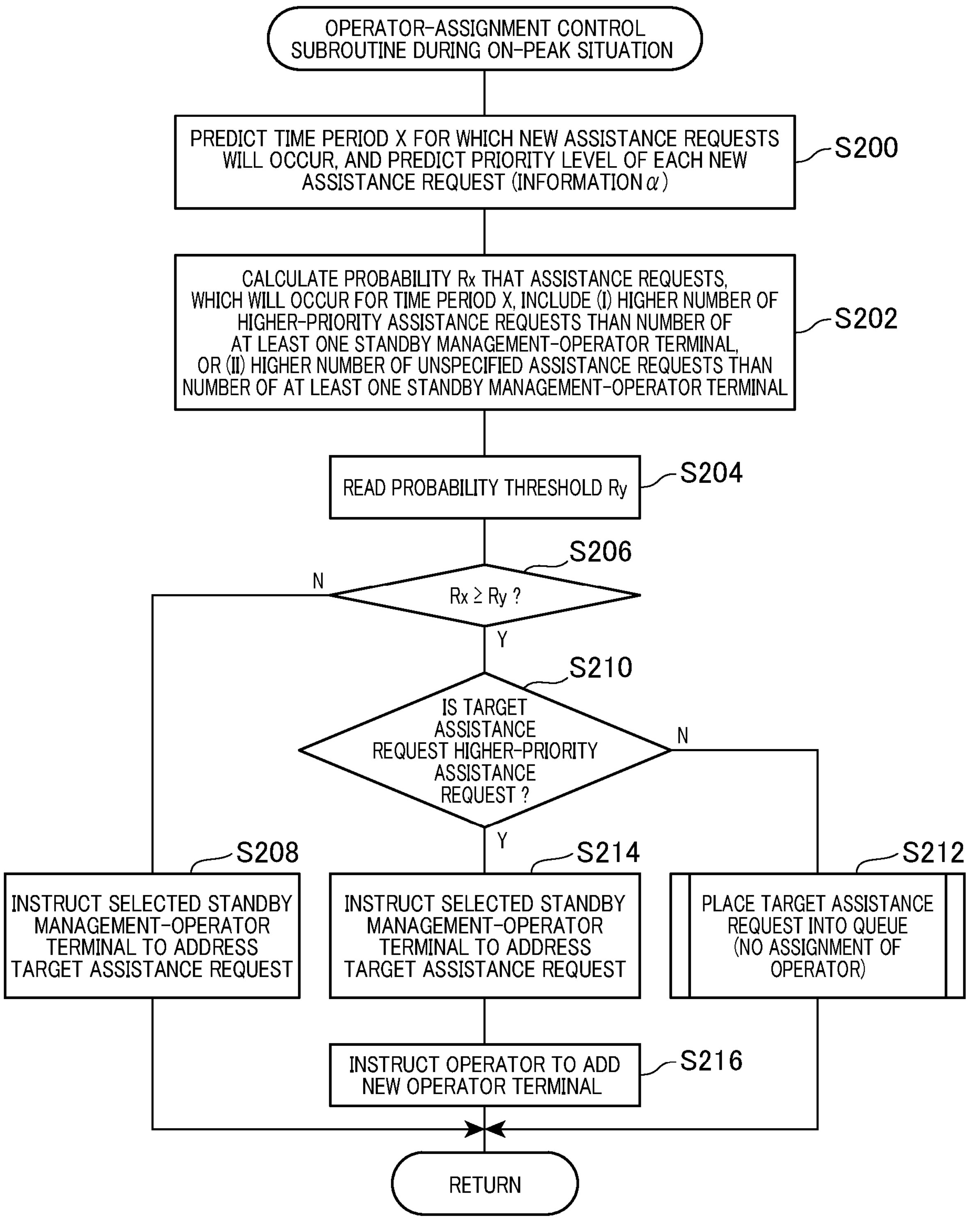
FIG. 8 is a flowchart illustrating an operator-assignment control subroutine of step S176 of FIG. 6 during the on-peak situation according to the second embodiment.

The flowchart of FIG. 8 illustrates the operator-assignment control subroutine in step S176 of FIG. 6 during the on-peak situation according to the second embodiment.

When starting the operator-assignment control subroutine in step S176 of FIG. 6 according to the second embodiment, the assistance controller 52 predicts, in accordance with, for example, the assistance-occurrence prediction big-data database 56, the time period X for which new assistance requests after the at least one target assistance request will occur, and predicts the priority level of each of the new assistance requests in step S200. The predicted time period X and the predicted priority level of each of the new assistance requests constitute the information $\alpha$.

Next, the assistance controller 52 calculates a probability Rx that the new assistance requests, which will occur for the time period X, include a higher number of higher-priority assistance requests than the number of the at least one standby management-operator terminal 41 in step S202.

Alternatively, in step S202, the assistance controller 52 calculates a probability Rx that the new assistance requests, which will occur for the time period X, include a higher number of unspecified assistance requests than the number of the at least one standby management-operator terminal 41; the assistance contents of the unspecified assistance requests are unspecified.

Next, the assistance controller 52 reads a probability threshold Ry that has been stored therein in step S204, and compares the probability Rx with the probability threshold Ry to accordingly determine whether the probability Rx is higher than or equal to the probability threshold Ry, which can be expressed by (Rx≥Ry) in step S206.

In response to determination that the probability Rx is lower than the probability threshold Ry, which can be expressed by (Rx≤Ry) (NO in step S206), the assistance controller 52 determines that (I) A higher number of higher-priority assistance requests than the number of the at least one standby management-operator terminal 41 will be unlikely to occur for the time period X, or (II) A higher number of unspecified assistance requests than the number of the at least one standby management-operator terminal 41 will be unlikely to occur for the time period X Then, the assistance controller 52 instructs a selected at least one of the standby management-operator terminals 41 to address the at least one target assistance request in step S208. Then, the assistance controller 52 terminates the operator-assignment control subroutine.

Otherwise, in response to determination that the probability Rx is higher than or equal to the probability threshold Ry, which can be expressed by (Rx Ry) (YES in step S206), the assistance controller 52 determines that (I) A higher number of higher-priority assistance requests than the number of the at least one standby management-operator terminal 41 will be likely to occur for the time period X, or (II) A higher number of unspecified assistance requests than the number of the at least one standby management-operator terminal 41 will be likely to occur for the time period X Then, the operator-assignment control subroutine proceeds to step S210.

In step S210, the assistance controller 52 determines whether the at least one target assistance request is a higher-priority assistance request.

In response to determination that the at least one target assistance request is not the higher-priority assistance request (NO in step S210), the assistance controller 52 determines that the at least one target assistance request is not a relatively urgent assistance request in step S212, and queues the at least one target assistance request, i.e., places the at least one target assistance request into a queue in step S212. Then, the assistance controller 52 terminates the operator-assignment control subroutine.

Otherwise, in response to determination that the at least one target assistance request is a higher-priority assistance request (YES in step S210), the assistance controller 52 determines that the at least one target assistance request is a relatively urgent assistance request in step S214, and instructs a selected at least one of the standby management-operator terminals 41 to address the at least one target assistance request in step S214. Following the operation in step S214, the assistance controller 52 instructs one of the operators to add one or more new operator terminals in step S216, and thereafter terminates the operator-assignment control subroutine.

Third Embodiment

The following describes the third embodiment of the present disclosure. In the first and third embodiments, descriptions of like parts between the first and third embodiments, to which like reference characters are assigned, are omitted.

The third embodiment has a specific feature that an operator-assignment control subroutine of the third embodiment in step S176 of FIG. 6 obtains, as information β, the priority levels of all the assistance requests that are being currently addressed by the assistance controller 52 to accordingly perform an operator-terminal assignment task for the at least one target assistance request. The assistance requests that are being currently addressed by the travel controller 5 will be referred to as pending assistance requests hereinafter.

Figure 9:
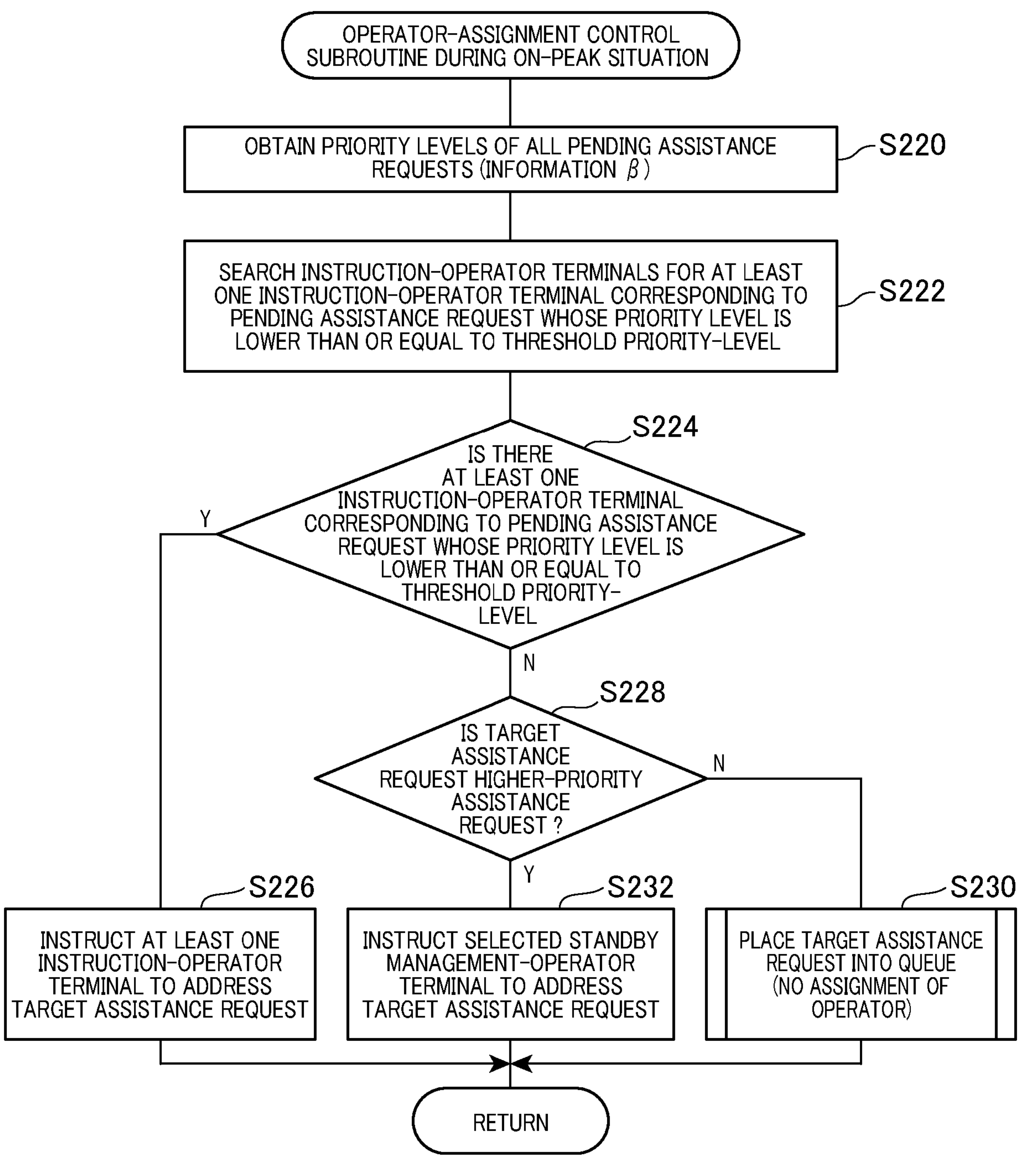
FIG. 9 is a flowchart illustrating an operator-assignment control subroutine of step S176 of FIG. 6 during the on-peak situation according to the third embodiment.

The flowchart of FIG. 9 illustrates the operator-assignment control subroutine in step S176 of FIG. 6 during the on-peak situation according to the third embodiment.

When starting the operator-assignment control subroutine in step S176 of FIG. 6 according to the third embodiment, the assistance controller 52 obtains the priority levels of all the pending assistance requests in step S220. The obtained priority levels of all the pending assistance requests constitute the information R.

Next, the assistance controller 52 searches the instruction-operator terminals 40 for at least one instruction-operator terminal 40 corresponding to the pending assistance request whose priority level is lower than or equal to a predetermined threshold priority-level in step S222.

Following the operation in step S222, the assistance controller 52 determines, based on the search result, whether there is at least one instruction-operator terminal 40 corresponding to the pending assistance request whose priority level is lower than or equal to the predetermined threshold priority-level in step S224.

In response to determination that there is at least one instruction-operator terminal 40 corresponding to the pending assistance request whose priority level is lower than or equal to the predetermined threshold priority-level (YES in step S224), the assistance controller 52 instructs the at least one instruction-operator terminal 40 to address the at least one target assistance request in priority to the pending assistance request in step S226. Then, the assistance controller 52 terminates the operator-assignment control subroutine. Specifically, the assistance controller 52 instructs the at least one instruction-operator terminal 40 to hold the pending assistance request whose priority level is, for example, an extremely low level, and instructs the at least one instruction-operator terminal 40 to address the at least one target assistance request in step S226.

Otherwise, in response to determination that there are no instruction-operator terminals 40 corresponding to the pending assistance request whose priority level is lower than or equal to the predetermined threshold priority-level (NO in step S224), the assistance controller 52 determines whether the at least one target assistance request is a higher-priority assistance request in step S228.

In response to determination that the at least one target assistance request is not the higher-priority assistance request (NO in step S228), the assistance controller 52 determines that the at least one target assistance request is not a relatively urgent assistance request in step S230, and queues the at least one target assistance request, i.e., places the at least one target assistance request into a queue in step S230. Then, the assistance controller 52 terminates the operator-assignment control subroutine.

Otherwise, in response to determination that the at least one target assistance request is a higher-priority assistance request (YES in step S228), the assistance controller 52 determines that the at least one target assistance request is a relatively urgent assistance request in step S232, and instructs a selected at least one of the standby management-operator terminals 41 to address the at least one target assistance request in step S232. Thereafter, the travel controller 32 terminates the operator-assignment control subroutine.

Fourth Embodiment

The following describes the fourth embodiment of the present disclosure. In the first and fourth embodiments, descriptions of like parts between the first and fourth embodiments, to which like reference characters are assigned, are omitted.

The fourth embodiment has a specific feature that an operator-assignment control subroutine of the second embodiment in step S176 of FIG. 6 obtains, as information γ, predicted completion time tx for each of the pending assistance requests; the predicted completion time tx for each of the pending assistance requests is required until addressing of the corresponding one of the pending assistance requests is completed. Then, the operator-assignment control subroutine of the second embodiment in step S176 of FIG. 6 performs, based on the information γ, an operator-terminal assignment task for the at least one target assistance request.

Figure 10:
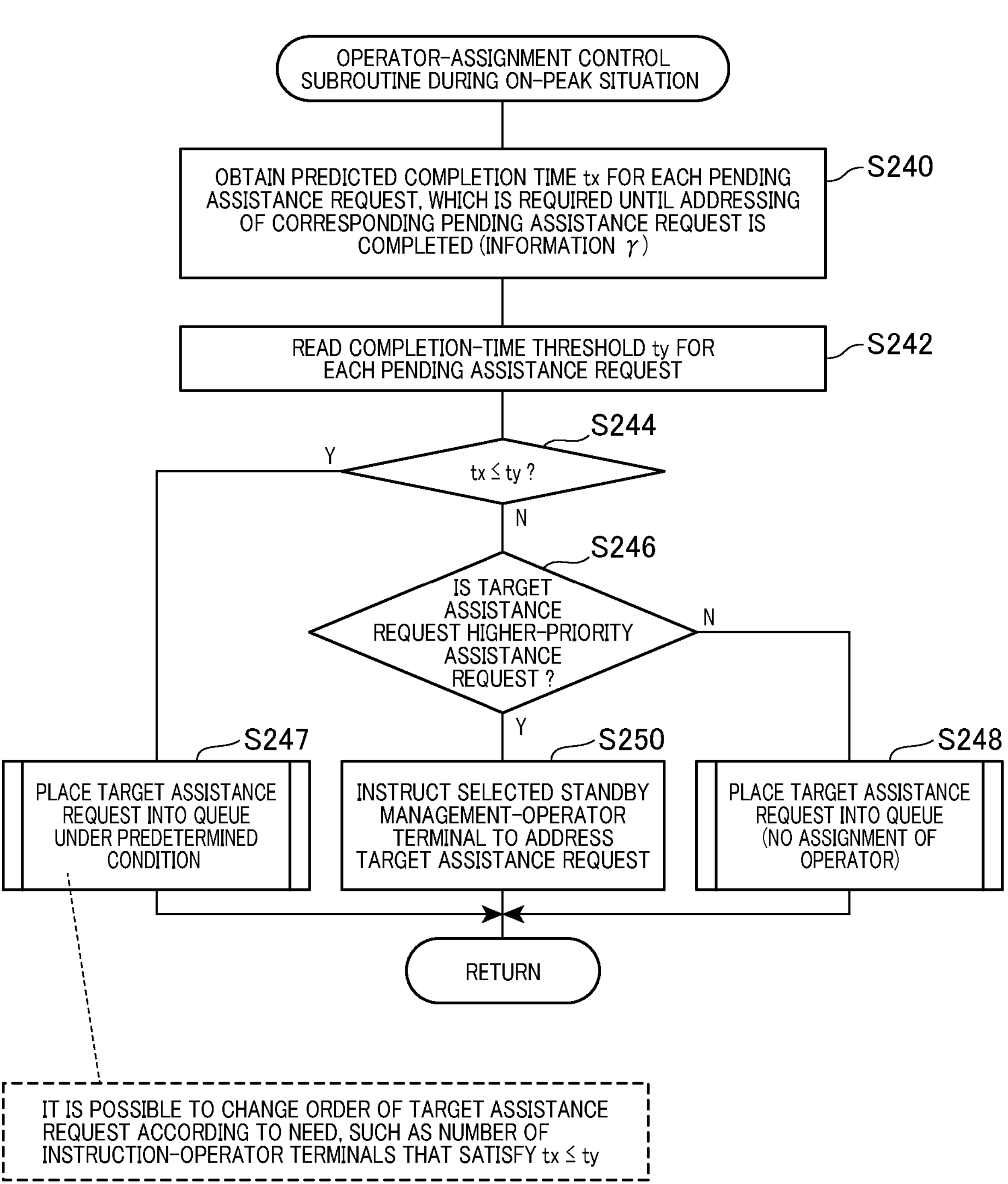
FIG. 10 is a flowchart illustrating an operator-assignment control subroutine of step S176 of FIG. 6 during the on-peak situation according to the fourth embodiment.

The flowchart of FIG. 10 illustrates the operator-assignment control subroutine in step S176 of FIG. 6 during the on-peak situation according to the fourth embodiment.

When starting the operator-assignment control subroutine in step S176 of FIG. 6 according to the fourth embodiment, the assistance controller 52 obtains predicted completion time tx for each of the pending assistance requests in step S240; the predicted time tx for each of the pending assistance requests is required until addressing of the corresponding one of the pending assistance requests is completed. The predicted completion time tx for each of the pending assistance requests constitutes the information γ.

Next, the assistance controller 52 reads a completion-time threshold ty for each of the pending assistance requests, which has been stored therein in step S242. Then, the assistance controller 52 compares the predicted completion time tx for each of the pending assistance requests with the completion-time threshold ty for the corresponding one of the pending assistance requests to accordingly determine whether the predicted completion time tx for each of the pending assistance requests is smaller than or equal to the completion-time threshold ty for the corresponding one of the pending assistance requests, which can be expressed by (tx ty) in step S244.

In response to determination that the predicted completion time tx for each of the pending assistance requests is greater than the completion-time threshold ty for the corresponding one of the pending assistance requests, which can be expressed by (tx>ty) (NO in step S244), the assistance controller 52 determines a present situation where addressing of the pending assistance requests seems not to have been completed in step S244. Then, the operator-assignment control subroutine proceeds to step S246.

Otherwise, in response to determination that the predicted completion time tx for at least one pending assistance request is smaller than or equal to the completion-time threshold ty for the corresponding at least one pending assistance request, which can be expressed by (tx≤ty) (YES in step S244), the assistance controller 52 determines that there is at least one instruction operator corresponding to the at least one pending assistance request who is going to become free soon, in other words, a standby time until the at least one instruction operator becomes free is acceptable. Then, the operator-assignment control subroutine proceeds to step S247.

In step S247, the assistance controller 52 queues the at least one target assistance request, i.e., places the at least one target assistance request into a queue, under a predetermined condition, and thereafter terminates the operator-assignment control subroutine.

The task of placing the at least one target assistance request into a queue under the predetermined means that it is possible to change the order of the at least one target assistance request to be addressed in the queue depending on the difference between the predicted completion time tx for the at least one pending assistance request and the completion-time threshold ty for the corresponding at least one pending assistance request. For example, if the difference between the predicted completion time tx for the at least one pending assistance request and the completion-time threshold ty for the corresponding at least one pending assistance request is very small, it is possible to adjust, in the queue, the order of the at least one target assistance request to be earlier.

Because the completion-time threshold ty for each assistance request is previously determined in accordance with the content thereof, the predicted completion times tx of some pending assistance requests are larger than the corresponding completion-time thresholds ty, and the predicted completion times tx of the remaining pending assistance requests are smaller than or equal to the corresponding completion-time thresholds ty.

Specifically, if the difference between the predicted completion time tx for the at least one pending assistance request and the completion-time threshold ty for the corresponding at least one pending assistance request is very small, so that the predicted completion time tx for the at least one pending assistance request is very closer to the acceptable standby time, it is possible to place the at least one target assistance request to be higher priority than the other assistance request that have been set in the queue whose differences are larger than that of the at least one pending assistance request.

In step S246, the assistance controller 52 determines whether the at least one target assistance request is a higher-priority assistance request.

In response to determination that the at least one target assistance request is not the higher-priority assistance request (NO in step S246), the assistance controller 52 determines that the at least one target assistance request is not a relatively urgent assistance request in step S248, and queues the at least one target assistance request, i.e., places the at least one target assistance request into the queue in step S248. Then, the assistance controller 52 terminates the operator-assignment control subroutine.

Otherwise, in response to determination that the at least one target assistance request is a higher-priority assistance request (YES in step S246), the assistance controller 52 determines that the at least one target assistance request is a relatively urgent assistance request in step S250, and instructs a selected at least one of the standby management-operator terminals 41 to address the at least one target assistance request in step S250. Thereafter, the travel controller 32 terminates the operator-assignment control subroutine.

Specifically, the fourth embodiment is configured to cause, without checking of the priority level of each pending assistance request, at least one management operator to address the at least one target assistance request in response to determination that (i) all the instruction operators seem not to become free soon or (ii) the at least one target assistance request is the high-priority assistance request.

Fifth Embodiment

The following describes the fifth embodiment of the present disclosure. In the first and fifth embodiments, descriptions of like parts between the first and fifth embodiments, to which like reference characters are assigned, are omitted.

The fifth embodiment has a specific feature that an operator-assignment control subroutine of the fifth embodiment in step S176 of FIG. 6 predicts, during the on-peak situation, the time period X for which new assistance requests after the at least one target assistance request will occur, and predicts the priority level of each of the new assistance requests. The predicted time period X and the predicted priority level of each of the new assistance requests constitute the information $\alpha$. Additionally, the operator-assignment control routine of the fifth embodiment obtains, as the information $\beta$, the priority levels of all the assistance requests that are being currently addressed by the travel controller 5. Then, the operator-assignment control routine of the fifth embodiment performs, based on the information $\alpha$ and the information $\beta$, the operator-terminal assignment task for the at least one target assistance request.

Figure 11:
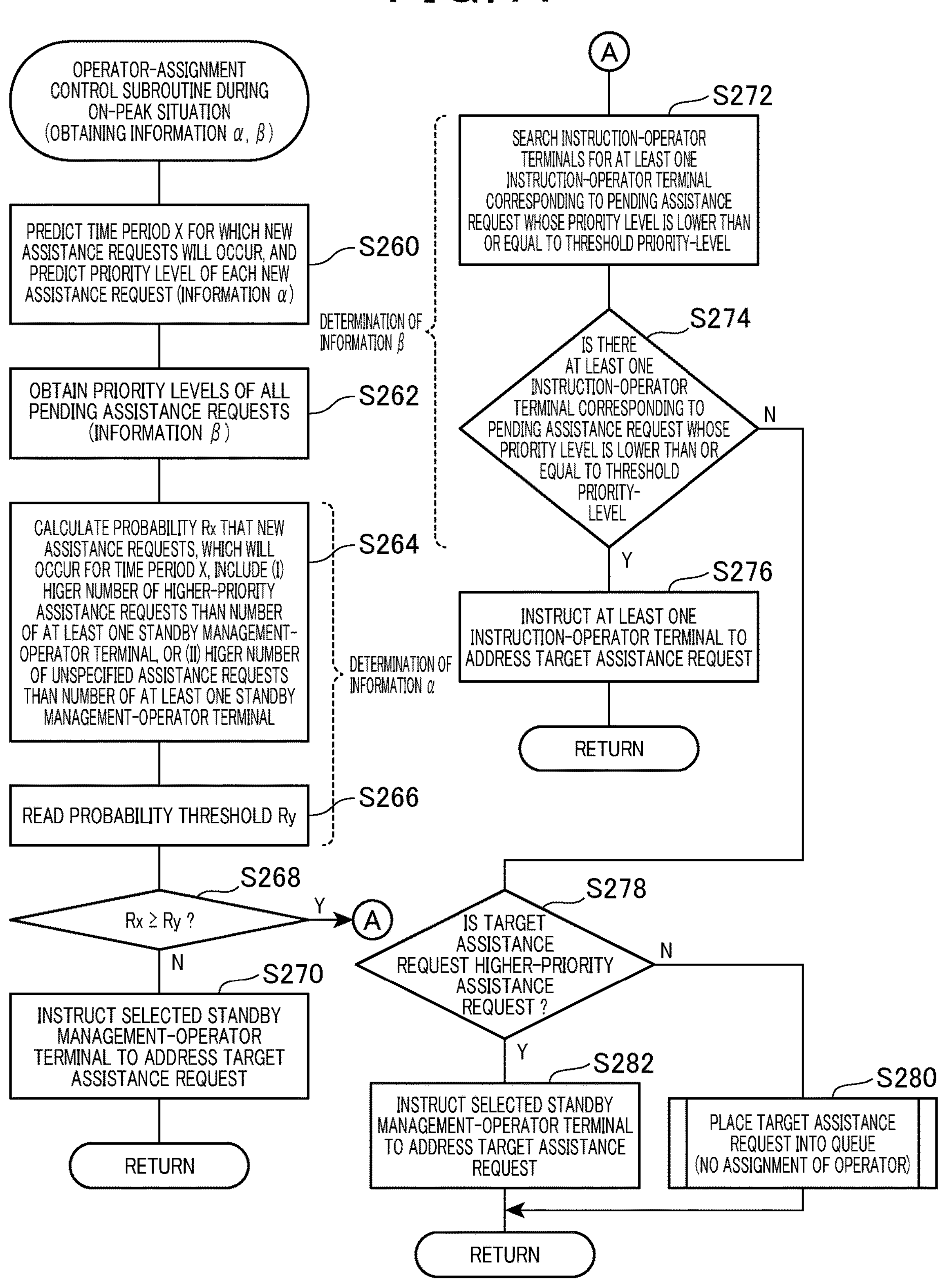
FIG. 11 is a flowchart illustrating an operator-assignment control subroutine of step S176 of FIG. 6 during the on-peak situation according to the fifth embodiment.

The flowchart of FIG. 11 illustrates the operator-assignment control subroutine in step S176 of FIG. 6 during the on-peak situation according to the fifth embodiment.

When starting the operator-assignment control subroutine in step S176 of FIG. 6 according to the fifth embodiment, the assistance controller 52 predicts the time period X for which new assistance requests after the at least one target assistance request will occur, and predicts the priority level of each of the new assistance requests in step S260 of FIG. 11. The predicted time period X and the predicted priority level of each of the new assistance requests constitute the information $\alpha$.

Next, the assistance controller 52 obtains the priority levels of all the pending assistance requests in step S262. The obtained priority levels of all the pending assistance requests constitute the information R.

Following the operation in step S262, the assistance controller 52 calculates the probability Rx that the new assistance requests, which will occur for the time period X, include a higher number of higher-priority assistance requests than the number of the at least one standby management-operator terminal 41 in step S264.

Alternatively, in step S264, the assistance controller 52 calculates the probability Rx that the new assistance requests, which will occur for the time period X, include a higher number of unspecified assistance requests than the number of the at least one standby management-operator terminal 41; the assistance contents of the unspecified assistance requests are unspecified.

Next, the assistance controller 52 reads the probability threshold Ry that has been stored therein in step S266, and compares the probability Rx with the probability threshold Ry to accordingly determine whether the probability Rx is higher than or equal to the probability threshold Ry, which can be expressed by ($Rx \geq Ry$) in step S268.

In response to determination that the probability Rx is lower than the probability threshold Ry, which can be expressed by ($Rx \leq Ry$) (NO in step S268), the assistance controller 52 determines that (I) A higher number of higher-priority assistance requests than the number of the at least one standby management-operator terminal 41 will be unlikely to occur for the time period X, or (II) A higher number of unspecified assistance requests than the number of the at least one standby management-operator terminal 41 will be unlikely to occur for the time period X Then, the assistance controller 52 instructs a selected at least one of the standby management-operator terminals 41 to address the at least one target assistance request in step S270. Then, the assistance controller 52 terminates the operator-assignment control subroutine.

Otherwise, in response to determination that the probability Rx is higher than or equal to the probability threshold Ry, which can be expressed by (Rx Ry) (YES in step S268), the assistance controller 52 determines that (I) A higher number of higher-priority assistance requests than the number of the at least one standby management-operator terminal 41 will be likely to occur for the time period X, or (II) A higher number of unspecified assistance requests than the number of the at least one standby management-operator terminal 41 will be likely to occur for the time period X Then, the operator-assignment control subroutine proceeds to step S272.

In step S272, the assistance controller 52 searches the instruction-operator terminals 40 for at least one instruction-operator terminal 40 corresponding to the pending assistance request whose priority level is lower than or equal to the predetermined threshold priority-level.

Following the operation in step S272, the assistance controller 52 determines, based on the search result, whether there is at least one instruction-operator terminal 40 corresponding to the pending assistance request whose priority level is lower than or equal to the predetermined threshold priority-level in step S274.

In response to determination that there is at least one instruction-operator terminal 40 corresponding to the pending assistance request whose priority level is lower than or equal to the predetermined threshold priority-level (YES in step S274), the assistance controller 52 instructs the at least one instruction-operator terminal 40 to address the at least one target assistance request in priority to the pending assistance request in step S276. Then, the assistance controller 52 terminates the operator-assignment control subroutine.

Otherwise, in response to determination that there are no instruction-operator terminals 40 corresponding to the pending assistance request whose priority level is lower than or equal to the predetermined threshold priority-level (NO in step S274), the assistance controller 52 determines whether the at least one target assistance request is a higher-priority assistance request in step S278.

In response to determination that the at least one target assistance request is not the higher-priority assistance request (NO in step S278), the assistance controller 52 determines that the at least one target assistance request is not a relatively urgent assistance request in step S280, and queues the at least one target assistance request, i.e., places the at least one target assistance request into a queue in step S280. Then, the assistance controller 52 terminates the operator-assignment control subroutine.

Otherwise, in response to determination that the at least one target assistance request is a higher-priority assistance request (YES in step S278), the assistance controller 52 determines that the at least one target assistance request is a relatively urgent assistance request in step S282, and instructs a selected at least one of the standby management-operator terminals 41 to address the at least one target assistance request in step S282. Thereafter, the assistance controller 52 terminates the operator-assignment control subroutine.

Sixth Embodiment

The following describes the sixth embodiment of the present disclosure. In the first and sixth embodiments, descriptions of like parts between the first and sixth embodiments, to which like reference characters are assigned, are omitted.

The sixth embodiment has a specific feature that an operator-assignment control subroutine of the sixth embodiment in step S176 of FIG. 6 predicts, during the on-peak situation, the time period X for which new assistance requests after the at least one target assistance request will occur, and predicts the priority level of each of the new assistance requests. The predicted time period X and the predicted priority level of each of the new assistance requests constitute the information α. Additionally, the operator-assignment control routine of the sixth embodiment obtains, as the information γ, the predicted completion time tx for each of the pending assistance requests; the predicted completion time tx for each of the pending assistance requests is required until addressing of the corresponding one of the pending assistance requests is completed.

Then, the operator-assignment control routine of the sixth embodiment performs, based on the information α and the information γ, the operator-terminal assignment task for the at least one target assistance request.

The flowchart of FIG. 12 illustrates the operator-assignment control subroutine in step S176 of FIG. 6 during the on-peak situation according to the sixth embodiment.

When starting the operator-assignment control subroutine in step S176 of FIG. 6 according to the sixth embodiment, the assistance controller 52 predicts the time period X for which new assistance requests after the at least one target assistance request will occur, and predicts the priority level of each of the new assistance requests in step S283A of FIG. 12. The predicted time period X and the predicted priority level of each of the new assistance requests constitute the information α.

Next, the assistance controller 52 obtains predicted completion time tx for each of the pending assistance requests in step S283B; the predicted time tx for each of the pending assistance requests is required until addressing of the corresponding one of the pending assistance requests is completed. The predicted completion time tx for each of the pending assistance requests constitutes the information γ.

Following the operation in step S283B, the assistance controller 52 calculates the probability Rx that the new assistance requests, which will occur for the time period X, include a higher number of higher-priority assistance requests than the number of the at least one standby management-operator terminal 41 in step S284.

Alternatively, in step S284, the assistance controller 52 calculates the probability Rx that the new assistance requests, which will occur for the time period X, include a higher number of unspecified assistance requests the number of the at least one standby management-operator terminal 41; the assistance contents of the unspecified assistance requests are unspecified.

Next, the assistance controller 52 reads the probability threshold Ry that has been stored therein in step S286, and compares the probability Rx with the probability threshold Ry to accordingly determine whether the probability Rx is higher than or equal to the probability threshold Ry, which can be expressed by (Rx≥Ry) in step S288.

In response to determination that the probability Rx is lower than the probability threshold Ry, which can be expressed by (Rx<Ry) (NO in step S288), the assistance controller 52 determines that (I) A higher number of higher-priority assistance requests than the number of the at least one standby management-operator terminal 41 will be unlikely to occur for the time period X, or (II) A higher number of unspecified assistance requests r than the number of the at least one standby management-operator terminal 41 will be unlikely to occur for the time period X Then, the assistance controller 52 instructs a selected at least one of the standby management-operator terminals 41 to address the at least one target assistance request in step S290. Then, the assistance controller 52 terminates the operator-assignment control subroutine.

Otherwise, in response to determination that the probability Rx is higher than or equal to the probability threshold Ry, which can be expressed by (Rx Ry) (YES in step S288), the assistance controller 52 determines that (I) A higher number of higher-priority assistance requests than the number of the at least one standby management-operator terminal 41 will be likely to occur for the time period X, or (II) A higher number of unspecified assistance requests than the number of the at least one standby management-operator terminal 41 will be likely to occur for the time period X Then, the operator-assignment control subroutine proceeds to step S292.

In step S292, the assistance controller 52 reads the completion-time threshold ty for each of the pending assistance requests, which has been stored therein. Then, the assistance controller 52 compares the predicted completion time tx for each of the pending assistance requests with the completion-time threshold ty for the corresponding one of the pending assistance requests to accordingly determine whether the predicted completion time tx for each of the pending assistance requests is smaller than or equal to the completion-time threshold ty for the corresponding one of the pending assistance requests, which can be expressed by (tx≤ty) in step S294.

In response to determination that the predicted completion time tx for each of the pending assistance requests is greater than the completion-time threshold ty for the corresponding one of the pending assistance requests, which can be expressed by (tx>ty) (NO in step S294), the assistance controller 52 determines a present situation where addressing of the pending assistance requests seems not to have been completed in step S294. Then, the operator-assignment control subroutine proceeds to step S296.

Otherwise, in response to determination that the predicted completion time tx for at least one pending assistance request is smaller than or equal to the completion-time threshold ty for the corresponding at least one pending assistance request, which can be expressed by (tx ty) (YES in step S294), the assistance controller 52 determines that there is at least one instruction operator corresponding to the at least one pending assistance request is going to become free soon, in other words, standby time until the at least one instruction operator becomes free is acceptable. Then, the operator-assignment control subroutine proceeds to step S298.

In step S298, the assistance controller 52 queues the at least one target assistance request, i.e., places the at least one target assistance request into a queue, under a predetermined condition, and thereafter terminates the operator-assignment control subroutine.

The task of placing the at least one target assistance request into a queue under the predetermined means that it is possible to change the order of the at least one target assistance request to be addressed in the queue depending on the difference between the predicted completion time tx for the at least one pending assistance request and the completion-time threshold ty for the corresponding at least one pending assistance request. For example, if the difference between the predicted completion time tx for the at least one pending assistance request and the completion-time threshold ty for the corresponding at least one pending assistance request is very small, it is possible to adjust, in the queue, the order of the at least one target assistance request to be earlier.

In step S296, the assistance controller 52 determines whether the at least one target assistance request is a higher-priority assistance request.

In response to determination that the at least one target assistance request is not the higher-priority assistance request (NO in step S296), the assistance controller 52 determines that the at least one target assistance request is not a relatively urgent assistance request in step S300, and queues the at least one target assistance request, i.e., places the at least one target assistance request into a queue in step S300. Then, the assistance controller 52 terminates the operator-assignment control subroutine.

Otherwise, in response to determination that the at least one target assistance request is a higher-priority assistance request (YES in step S296), the assistance controller 52 determines that the at least one target assistance request is a relatively urgent assistance request in step S302, and instructs a selected at least one of the standby management-operator terminals 41 to address the at least one target assistance request in step S302. Thereafter, the assistance controller 52 terminates the operator-assignment control subroutine.

Seventh Embodiment

The following describes the seventh embodiment of the present disclosure. In the first and seventh embodiments, descriptions of like parts between the first and seventh embodiments, to which like reference characters are assigned, are omitted.

The seventh embodiment has a specific feature that an operator-assignment control subroutine of the third embodiment in step S176 of FIG. 6 obtains, as the information β, the priority levels of all the assistance requests that are being currently addressed by the assistance controller 52. Additionally, the operator-assignment control subroutine of the second embodiment in step S176 of FIG. 6 obtains, as the information γ, predicted completion time tx for each of the pending assistance requests; the predicted completion time tx for each of the pending assistance requests is required until addressing of the corresponding one of the pending assistance requests is completed. Then, the operator-assignment control subroutine of the second embodiment in step S176 of FIG. 6 performs, based on the information β and the information γ, an operator-terminal assignment task for the at least one target assistance request.

The flowchart of FIG. 13 illustrates the operator-assignment control subroutine in step S176 of FIG. 6 during the on-peak situation according to the seventh embodiment.

When starting the operator-assignment control subroutine in step S176 of FIG. 6 according to the seventh embodiment, the assistance controller 52 obtains the priority levels of all the pending assistance requests in step S320 of FIG. 13. The obtained priority levels of all the pending assistance requests constitute the information β.

Next, the assistance controller 52 obtains the predicted completion time tx for each of the pending assistance requests in step S322; the predicted time tx for each of the pending assistance requests is required until addressing of the corresponding one of the pending assistance requests is completed. The predicted completion time tx for each of the pending assistance requests constitutes the information γ. Next, the assistance controller 52 searches the instruction-operator terminals 40 for at least one instruction-operator terminal 40 corresponding to the pending assistance request whose priority level is lower than or equal to the predetermined threshold priority-level in step S324.

Following the operation in step S324, the assistance controller 52 determines, based on the search result, whether there is at least one instruction-operator terminal 40 corresponding to the pending assistance request whose priority level is lower than or equal to the predetermined threshold priority-level in step S326.

In response to determination that there are no instruction-operator terminals 40 corresponding to the pending assistance request whose priority level is lower than or equal to the predetermined threshold priority-level (NO in step S326), the assistance controller 52 determines whether the at least one target assistance request is a higher-priority assistance request in step S328.

In response to determination that the at least one target assistance request is not the higher-priority assistance request (NO in step S328), the assistance controller 52 determines that the at least one target assistance request is not a relatively urgent assistance request in step S330, and queues the at least one target assistance request, i.e., places the at least one target assistance request into a queue in step S330. Then, the assistance controller 52 terminates the operator-assignment control subroutine.

Otherwise, in response to determination that the at least one target assistance request is a higher-priority assistance request (YES in step S328), the assistance controller 52 determines that the at least one target assistance request is a relatively urgent assistance request in step S332, and instructs a selected at least one of the standby management-operator terminals 41 to address the at least one target assistance request in step S332. Thereafter, the travel controller 32 terminates the operator-assignment control subroutine.

Otherwise, in response to determination that there is at least one instruction-operator terminal 40 corresponding to the pending assistance request whose priority level is lower than or equal to the predetermined threshold priority-level (YES in step S326), the assistance controller 52 reads the completion-time threshold ty for the at least one instruction-operator terminal 40 in step S334. Then, the assistance controller 52 compares the predicted completion time tx for the at least one instruction-operator terminal 40 with the completion-time threshold ty for the at least one instruction-operator terminal 40 to accordingly determine whether the predicted completion time tx for the at least one instruction-operator terminal 40 is smaller than or equal to the completion-time threshold ty for the at least one instruction-operator terminal 40, which can be expressed by (tx≤ty) in step S336.

In response to determination that the predicted completion time tx for the at least one instruction-operator terminal 40 is greater than the completion-time threshold ty for the at least one instruction-operator terminal 40, which can be expressed by (tx>ty) (NO in step S336), the assistance controller 52 determines a present situation where addressing of the pending assistance requests seems not to have been completed in step S336. Then, the operator-assignment control subroutine proceeds to step S338.

Otherwise, in response to determination that the predicted completion time tx for the at least one instruction-operator terminal 40 is smaller than or equal to the completion-time threshold ty for the at least one instruction-operator terminal 40, which can be expressed by (tx ty) (YES in step S336), the assistance controller 52 determines that there is at least one instruction operator corresponding to the at least one pending assistance request is going to become free soon, in other words, standby time until the at least one instruction operator becomes free is acceptable. Then, the operator-assignment control subroutine proceeds to step S340.

In step S340, the assistance controller 52 queues the at least one target assistance request, i.e., places the at least one target assistance request into a queue, under the predetermined condition, and thereafter terminates the operator-assignment control subroutine.

The task of placing the at least one target assistance request into a queue under the predetermined means that it is possible to change the order of the at least one target assistance request to be addressed in the queue depending on the difference between the predicted completion time tx for the at least one pending assistance request and the completion-time threshold ty for the corresponding at least one pending assistance request. For example, if the difference between the predicted completion time tx for the at least one pending assistance request and the completion-time threshold ty for the corresponding at least one pending assistance request is very small, it is possible to adjust, in the queue, the order of the at least one target assistance request to be earlier.

Because the completion-time threshold ty for each assistance request is previously determined in accordance with the content thereof, the predicted completion times tx of some pending assistance requests are larger than the corresponding completion-time thresholds ty, and the predicted completion times tx of the remaining pending assistance requests are smaller than or equal to the corresponding completion-time thresholds ty.

Specifically, if the difference between the predicted completion time tx for the at least one pending assistance request and the completion-time threshold ty for the corresponding at least one pending assistance request is very small, so that the predicted completion time tx for the at least one pending assistance request is very closer to the acceptable standby time, it is possible to place the at least one target assistance request to be higher priority than the other assistance request that have been set in the queue whose differences are larger than that of the at least one pending assistance request.

In step S338, the assistance controller 52 determines whether the at least one target assistance request is a higher-priority assistance request.

In response to determination that the at least one target assistance request is not the higher-priority assistance request (NO in step S338), the assistance controller 52 determines that the at least one target assistance request is not a relatively urgent assistance request in step S342, and queues the at least one target assistance request, i.e., places the at least one target assistance request into a queue in step S342. Then, the assistance controller 52 terminates the operator-assignment control subroutine.

Otherwise, in response to determination that the at least one target assistance request is a higher-priority assistance request (YES in step S338), the assistance controller 52 determines that the at least one target assistance request is a relatively urgent assistance request in step S344, and instructs a selected at least one of the searched instruction-operator terminals 40 to address the at least one target assistance request in priority to the pending assistance request in step S344. Thereafter, the travel controller 32 terminates the operator-assignment control subroutine.

For example, in step S344, in order to prevent the at least one target assistance request from being assigned to any of the management-operator terminals 41 as much as possible, the assistance controller 52 can select one of the instruction-operator terminals 40, which addresses the pending assistance request whose priority level is lower than or equal to the predetermined threshold priority-level, and assign the at least one target assistance request to the selected instruction-operator terminal 40.

Alternatively, in step S344, the assistance controller 52 can perform a stepwise assignment approach of (I) Selecting one of the instruction-operator terminals 40, which addresses the pending assistance request whose priority level is lower than the priority level of the at least one target assistance request to accordingly instruct the selected instruction-operator terminal 40 to address the at least one target assistance request (II) After the instruction, if the selected instruction-operator terminal 40 refuses addressing of the at least one target assistance request, instructing a selected at least one of the standby management-operator terminals 41 to address the at least one target assistance request

Eighth Embodiment

The following describes the eighth embodiment of the present disclosure. In the first and eighth embodiments, descriptions of like parts between the first and eighth embodiments, to which like reference characters are assigned, are omitted.

The eighth embodiment has a specific feature that an operator-assignment control subroutine of the eighth embodiment in step S176 of FIG. 6 predicts, during the on-peak situation, the time period X for which new assistance requests after the at least one target assistance request will occur, and predicts the priority level of each of the new assistance requests. The predicted time period X and the predicted priority level of each of the new assistance requests constitute the information $\alpha$.

Additionally, the operator-assignment control routine of the eighth embodiment obtains, as the information $\beta$, the priority levels of all the assistance requests that are being currently addressed by the travel controller 5, and obtains, as the information $\gamma$, predicted completion time tx for each of the pending assistance requests; the predicted completion time tx for each of the pending assistance requests is required until addressing of the corresponding one of the pending assistance requests is completed.

Then, the operator-assignment control routine of the eighth embodiment performs, based on the information $\alpha$, the information (3, and the information $\gamma$, the operator-terminal assignment task for the at least one target assistance request.

The flowchart of FIG. 14 illustrates the operator-assignment control subroutine in step S176 of FIG. 6 during the on-peak situation according to the eighth embodiment.

When starting the operator-assignment control subroutine in step S176 of FIG. 6 according to the eighth embodiment, the assistance controller 52 predicts the time period X for which new assistance requests after the at least one target assistance request will occur, and predicts the priority level of each of the new assistance requests in step S350 of FIG. 14. The predicted time period X and the predicted priority level of each of the new assistance requests constitute the information $\alpha$.

Next, the assistance controller 52 obtains the priority levels of all the pending assistance requests in step S352. The obtained priority levels of all the pending assistance requests constitute the information $\beta$.

Subsequently, the assistance controller 52 obtains the predicted completion time tx for each of the pending assistance requests in step S354; the predicted time tx for each of the pending assistance requests is required until addressing of the corresponding one of the pending assistance requests is completed. The predicted completion time tx for each of the pending assistance requests constitutes the information $\gamma$.

Following the operation in step S354, the assistance controller 52 calculates the probability Rx that the new assistance requests, which will occur for the time period X, include a higher number of higher-priority assistance requests than the number of the at least one standby management-operator terminal 41 in step S356.

Alternatively, in step S356, the assistance controller 52 calculates the probability Rx that the new assistance requests, which will occur for the time period X, include a higher number of unspecified assistance requests than the number of the at least one standby management-operator terminal 41; the assistance contents of the unspecified assistance requests are unspecified.

Next, the assistance controller 52 reads the probability threshold Ry that has been stored therein in step S358, and compares the probability Rx with the probability threshold Ry to accordingly determine whether the probability Rx is higher than or equal to the probability threshold Ry, which can be expressed by (Rx Ry) in step S360.

In response to determination that the probability Rx is lower than the probability threshold Ry, which can be expressed by (Rx<Ry) (NO in step S360), the assistance controller 52 determines that (I) A higher number of higher-priority assistance requests than the number of the at least one standby management-operator terminal 41 will be unlikely to occur for the time period X, or (II) A higher number of unspecified assistance requests than the number of the at least one standby management-operator terminal 41 will be unlikely to occur for the time period X Then, the assistance controller 52 instructs a selected at least one of the standby management-operator terminals 41 to address the at least one target assistance request in step S362. Then, the assistance controller 52 terminates the operator-assignment control subroutine.

Otherwise, in response to determination that the probability Rx is higher than or equal to the probability threshold Ry, which can be expressed by (Rx Ry) (YES in step S360), the assistance controller 52 determines that (I) A higher number of higher-priority assistance requests than the number of the at least one standby management-operator terminal 41 will be likely to occur for the time period X, or (II) A higher number of unspecified assistance requests than the number of the at least one standby management-operator terminal 41 will be likely to occur for the time period X Then, the operator-assignment control subroutine proceeds to step S364.

In step S364, the assistance controller 52 searches the instruction-operator terminals 40 for at least one instruction-operator terminal 40 corresponding to the pending assistance request whose priority level is lower than or equal to the predetermined threshold priority-level.

Following the operation in step S364, the assistance controller 52 determines, based on the search result, whether there is at least one instruction-operator terminal 40 corresponding to the pending assistance request whose priority level is lower than or equal to the predetermined threshold priority-level in step S366.

In response to determination that there are no instruction-operator terminals 40 corresponding to the pending assistance request whose priority level is lower than or equal to the predetermined threshold priority-level (NO in step S366), the assistance controller 52 determines whether the at least one target assistance request is a higher-priority assistance request in step S368.

In response to determination that the at least one target assistance request is not the higher-priority assistance request (NO in step S368), the assistance controller 52 determines that the at least one target assistance request is not a relatively urgent assistance request in step S370, and queues the at least one target assistance request, i.e., places the at least one target assistance request into a queue in step S370. Then, the assistance controller 52 terminates the operator-assignment control subroutine.

Otherwise, in response to determination that the at least one target assistance request is a higher-priority assistance request (YES in step S368), the assistance controller 52 determines that the at least one target assistance request is a relatively urgent assistance request in step S372, and instructs a selected at least one of the standby management-operator terminals 41 to address the at least one target assistance request in step S372. Following the operation in step S372, the assistance controller 52 instructs one of the operators to add one or more new operator terminals in step S374. Thereafter, the travel controller 32 terminates the operator-assignment control subroutine.

Otherwise, in response to determination that there is at least one instruction-operator terminal 40 corresponding to the pending assistance request whose priority level is lower than or equal to the predetermined threshold priority-level (YES in step S366), the assistance controller 52 reads the completion-time threshold ty for the at least one instruction-operator terminal 40 in step S376. Then, the assistance controller 52 compares the predicted completion time tx for the at least one instruction-operator terminal 40 with the completion-time threshold ty for the at least one instruction-operator terminal 40 to accordingly determine whether the predicted completion time tx for the at least one instruction-operator terminal 40 is smaller than or equal to the completion-time threshold ty for the at least one instruction-operator terminal 40, which can be expressed by ($tx \leq ty$) in step S378.

In response to determination that the predicted completion time tx for the at least one instruction-operator terminal 40 is greater than the completion-time threshold ty for the at least one instruction-operator terminal 40, which can be expressed by ($tx > ty$) (NO in step S378), the assistance controller 52 determines a present situation where addressing of the pending assistance requests seems not to have been completed in step S378. Then, the operator-assignment control subroutine proceeds to step S380.

Otherwise, in response to determination that the predicted completion time tx for the at least one instruction-operator terminal 40 is smaller than or equal to the completion-time threshold ty for the at least one instruction-operator terminal 40, which can be expressed by (tx ty) (YES in step S378), the assistance controller 52 determines that there is at least one instruction operator corresponding to the at least one pending assistance request is going to become free soon, in other words, standby time until the at least one instruction operator becomes free is acceptable. Then, the operator-assignment control subroutine proceeds to step S382.

In step S382, the assistance controller 52 queues the at least one target assistance request, i.e., places the at least one target assistance request into a queue, under the predetermined condition, and thereafter terminates the operator-assignment control subroutine.

The task of placing the at least one target assistance request into a queue under the predetermined means that it is possible to change the order of the at least one target assistance request to be addressed in the queue depending on the difference between the predicted completion time tx for the at least one pending assistance request and the completion-time threshold ty for the corresponding at least one pending assistance request. For example, if the difference between the predicted completion time tx for the at least one pending assistance request and the completion-time threshold ty for the corresponding at least one pending assistance request is very small, it is possible to adjust, in the queue, the order of the at least one target assistance request to be earlier.

Because the completion-time threshold ty for each assistance request is previously determined in accordance with the content thereof, the predicted completion times tx of some pending assistance requests are larger than the corresponding completion-time thresholds ty, and the predicted completion times tx of the remaining pending assistance requests are smaller than or equal to the corresponding completion-time thresholds ty.

Specifically, if the difference between the predicted completion time tx for the at least one pending assistance request and the completion-time threshold ty for the corresponding at least one pending assistance request is very small, so that the predicted completion time tx for the at least one pending assistance request is very closer to the acceptable standby time, it is possible to place the at least one target assistance request to be higher priority than the other assistance request that have been set in the queue whose differences are larger than that of the at least one pending assistance request.

In step S380, the assistance controller 52 determines whether the at least one target assistance request is a higher-priority assistance request.

In response to determination that the at least one target assistance request is not the higher-priority assistance request (NO in step S380), the assistance controller 52 determines that the at least one target assistance request is not a relatively urgent assistance request in step S384, and queues the at least one target assistance request, i.e., places the at least one target assistance request into a queue in step S384. Then, the assistance controller 52 terminates the operator-assignment control subroutine.

Otherwise, in response to determination that the at least one target assistance request is a higher-priority assistance request (YES in step S380), the assistance controller 52 determines that the at least one target assistance request is a relatively urgent assistance request in step S386, and instructs a selected at least one of the searched instruction-operator terminals 40 to address the at least one target assistance request in priority to the pending assistance request in step S386. Thereafter, the travel controller 32 terminates the operator-assignment control subroutine.

For example, in step S386, in order to prevent the at least one target assistance request from being assigned to any of the management-operator terminals 41 as much as possible, the assistance controller 52 can select one of the instruction-operator terminals 40, which addresses the pending assistance request whose priority level is lower than or equal to the predetermined threshold priority-level, and assign the at least one target assistance request to the selected instruction-operator terminal 40.

Alternatively, in step S386, the assistance controller 52 can perform a stepwise assignment approach of (I) Selecting one of the instruction-operator terminals 40, which addresses the pending assistance request whose priority level is lower than the priority level of the at least one target assistance request to accordingly instruct the selected instruction-operator terminal 40 to address the at least one target assistance request (II) After the instruction, if the selected instruction-operator terminal 40 refuses addressing of the at least one target assistance request, instructing a selected at least one of the standby management-operator terminals 41 to address the at least one target assistance request The assistance controller 52 of each of the first to eighth embodiments set forth above serves as the operator assignment function 52D (see FIG. 2) to search, in response to one or more travel assistance requests sent from one or more vehicles 12, the instruction-operator terminal 40 for selection of one or more instruction-operator terminals to be assigned for the one or more travel assistance requests.

The assistance controller 52 of each of the first to eighth embodiments serves as the operator assignment function 52D to, upon determination that the number of the travel assistance requests is larger than the number of the instruction-operator terminals 40 depending on, for example, traveling situations of the vehicles 12, the current weather conditions, and/or the current time period, place, in the stable state, the travel assistance requests into a queue.

Additionally, the assistance controller 52 of each of the first to eighth embodiments serves as the operator assignment function 52D to, if it comes down to the on-peak situation in the stable state, instruct a selected one of the management-operator terminals 41, each of which typically serves to manage the corresponding instruction-operator terminals 40, to address one or more assistance requests as long as the one or more assistance requests are the higher-priority assistance requests.

Additionally, the assistance controller 52 of each of the first to eighth embodiments is configure to reduce, based on at least one of the information α, the information (3, and the information γ, reduce the number of assistance requests to be set in a queue.

The following provides TABLE 2 that shows the advantageous benefit of reducing, using, as a fundamental feature, the management-operator terminals 41, the number of assistance requests to be set in a queue achieved by the first embodiment.

Additionally, TABLE 2 shows, for each of the first to eighths embodiments, (i) how the corresponding embodiment works and (ii) advantageous benefits achieved by the corresponding embodiment in accordance with at least one of the information α, the information (3, and the information γ.

TABLE 2

| EMBODIMENT | FEATURE | INFORMATION α | INFORMATION β | INFORMATION γ | OPERATION AND BENEFIT |
|---|---|---|---|---|---|
| FIRST | ○ | x | x | x | INSTRUCTING MANAGEMENT-OPERATOR TERMINAL TO ADDRESS HIGHER-PRIORITY TARGET ASSISTANCE REQUEST ENABLES HIGHER-PRIORITY TARGET ASSISTANCE REQUEST TO BE ADDRESSED IMMEDIATELY |
| SECOIND | ○ | ○ | x | x | INSTRUCTING MANAGEMENT-OPERATOR TERMINAL TO ADDRESS ASSISTANCE REQUEST ENABLES ASSISTANCE REQUEST TO BE ADDRESSED IMMEDIATELY IF NO NEXT ASSISTANCE REQUEST OCCURS FOR A WHILE |
| THIRD | ○ | x | ○ | x | INSTRUCTING INSTRUCTION-OPERATOR TERMINAL ADDRESSING LOW PRIORITY-LEVEL ASSISTANCDE REQUEST TO ADDRESS TARGET ASSISTANCE REQUEST ENABLES MANAGEMENT-OPERATOR TERMINAL TO BE IN STANDBY STATE |
| FOURTH | ○ | x | x | x | WAITING UNTIL INSTRUCTION-OPERATOR TERMINAL COMPLETES ADDRESSING OF ASSISTANCDE REQUEST PREVENTS MANAGEMENT-OPERATOR TERMINAL FROM ADDRESSING TARGET ASSISTANCE REQUEST |
| FIFTH | ○ | ○ | ○ | x | INSTRUCTING MANAGEMENT-OPERATOR TERMINAL TO ADDRESS ASSISTANCE REQUEST IF NEXT ASSISTANCE REQUEST OCCURS IMMEDIATELY ENABLES MANAGEMENT-OPERATOR TERMINAL TO BE PRESERVED |
| SIXTH | ○ | ○ | x | ○ | AS COMPARED WITH SECOND AND FOURTH EMBODIMENTS, IT IS POSSIBLE TO MORE EFFICIENTLY PREDICT CONDITION THAT TARGET ASSISTANCE REQUEST IS UNASSIGNED TO MAGANEMNENT-OPERATOR TERMINAL |
| SEVENTH | ○ | x | ○ | ○ | WAITING UNTIL INSTRUCTION-OPERATOR TERMINAL COMPLETES ADDRESSING OF ASSISTANCDE REQUEST ENABLES INTERRUPTION TO BE REDUCED |
| EIGHTH | ○ | ○ | ○ | ○ | IT IS POSSIBLE TO ADDRESS HIGHER-PRIORITY TARGET ASSISTANCE REQUEST IMMEDIATELY WHILE CAUSING MANAGEMENT-OPERATOR TERMNINAL TO BE IN STANDBY MODE |

Ninth Embodiment

The following describes the ninth embodiment of the present

DISCLOSURE

Each of the first to eighth embodiments has described that the operators OP are paired to the respective terminals 40, 41.

In contrast, the ninth embodiment is configured such that terminals PC, each of which has the same configuration, are not previously separated into the instruction terminals 40 and the management terminals 41. That is, if an operator belonging to the first group as the instruction operator OP logs in to a selected terminal PC, the selected terminal PC is categorized into the instruction terminal 40. Similarly, if an operator belonging to the second group as the management operator OP logs in to a selected terminal PC, the selected terminal PC is categorized into the management terminal 41.

In other words, each terminal PC can become either the instruction terminal 40 or the management terminal 41 depending on a log-in operator who belongs to which of the first group and the second group.

Specifically, each of the instruction-operator terminals 40 handled by the operators OP who belong to the first group has the main function, i.e., the first function, of addressing assistance requests sent from at least one of the vehicles 12.

In contrast, each of the management-operator terminals 41 handled by the operators OP who belong to the second group has the main function, i.e., the second function, of accessing the operator working-situation database 54 to accordingly report information representing the working situation of each instruction-operator terminal i.e., each instruction operator OR Any operator OP, who handles the corresponding management-operator terminal 41, can cause the corresponding management-operator terminal 41 to switch the second function being carried out thereby to the first function.

FIG. 15 is a functional block diagram illustrating a functional configuration of the autonomous control apparatus 20 of each vehicle 12 and a functional configuration of the travel assist system 10 according to the ninth embodiment. The functional configuration of the autonomous control apparatus 20 of each vehicle 12 performs transmission and/or reception of information items with respect to the vehicle assist system and the infrastructural management system 24; the information items are related to an assistance request transmitted from the corresponding vehicle 12 to the vehicle assist system 10.

In the first embodiment (see FIG. 2) and the ninth embodiment, descriptions of like parts between the first and ninth embodiments, to which like reference characters are assigned, are omitted.

As described above, the terminals PC, each of which has the same hardware configuration, are provided.

As illustrated in FIG. 15, each terminal PC includes the first function that serves as the instruction-operator terminal 40, and the second function that serves as the management-operator terminal 41.

Specifically, each terminal PC includes an operator information storage 60, a communication unit 62, a display unit 64, an operation device 66, and an assistance instructor 68: these components 60, 62, 64, 66, and 68 serve to implement the first function.

Each terminal PC includes an assistance content determiner 70 and a priority-level determiner 72; these components 70 and 72 serve to implement the second function.

The first function of each terminal PC is configured to receive an assistance-response instruction sent from the travel assist control unit obtain travel-assistance information, and output, based on the assistance-response instruction and the travel-assistance information, assistance-instruction information to the at least one assistance-request vehicle 12 (see FIG. 1).

The second function of each terminal PC is configured to receive an assistance-content checking instruction and a priority-level determination instruction sent from the travel assist control unit 10A, and returns, based on the assistance-content checking instruction and priority-level setting instruction, assistance-content setting information and priority-level setting information to the travel assist control unit 10A.

The following describes, using FIG. 16, a travel-assist control routine to be carried out by each terminal PC, which is equivalent to the travel-assist control routine illustrated in FIG. 6 while focusing on the flow of operator's operations.

For operations in the travel-assist control routine illustrated in FIG. 16, which are respectively identical to corresponding operations in the travel-assist control routine illustrated in FIG. 6, identical step numbers are assigned to the corresponding operations in the travel-assist control routine illustrated in FIG. 6.

In contrast, for remaining operations in the travel-assist control routine illustrated in FIG. 16, which are respectively changed to corresponding operations in the travel-assist control routine illustrated in FIG. 6, step numbers, are assigned to each of which the character A has been added as compared with the step numbers of the corresponding operations in the travel-assist control routine illustrated in FIG. 6.

In step S150, the assistance controller 52 of the travel assist system 10 determines whether the assistance controller 52 has received at least one assistance request, i.e., at least one target assistance request, from at least one vehicle 12, i.e., at least one assistance-request vehicle 12. Specifically, the assistance controller 52 waits for the affirmative determination in step S150.

In response to determination that the assistance controller 52 has received the at least one target assistance request from the at least one assistance-request vehicle 12 (YES in step S150), the assistance controller 52 checks the content of the at least one target assistance request, and thereafter performs the priority automatic setting task of automatically setting the priority level of the at least one target assistance request in step S152.

There are two cases. The first case is that the priority automatic setting task can be carried out, and the second case is that the priority automatic setting task cannot be carried out. From this viewpoint, the assistance controller 52 performs the task of determining whether the assistance controller 52 has succeeded or failed in executing the automatic setting task in step S154. Thereafter, the travel-assist control routine proceeds to step S156A.

In step S156A, the assistance controller 52 obtains a free situation indicative of whether each instruction operator OP included in the first group is free to accordingly determine whether there is at least one standby instruction operator OP included in the first group in step S158A.

In response to determination that there is at least one standby instruction operator OP included in the first group (YES in step S158A), the travel-assist control routine proceeds to step S160A. In step S160A, the assistance controller 52 instructs the at least one free, i.e., standby, instruction operator OP to address the at least one target assistance request. Thereafter, the travel-assist control routine proceeds to step S162.

In step S162, the assistance controller 52 determines, based on the determination result in step S154, whether the automatic setting task has been succeeded, and terminates the travel-assist control routine in response to determination that the automatic setting task has been succeeded.

Otherwise, in response to determination that the automatic setting task has been failed, the travel-assist control routine proceeds to step S164A.

In step S164A, the assistance controller 52 sets the priority level of the at least one target assistance request in accordance with any one of the third procedure and the fourth procedure, and thereafter, terminates the travel-assist control routine.

The third procedure is to manually set the priority level of the at least one target assistance request when at least one of the operators OP belonging to the second group.

The fourth procedure is configured such that the travel assist system 10 automatically sets the priority level of the at least one target assistance request based on the assistance situation of the operators OP belonging to the first group.

Otherwise, in response to determination that there are no standby instruction operators OP included in the first group (NO in step S158A), the travel-assist control routine proceeds to step S166.

In step S166, the assistance controller 52 determines whether the priority level of the at least one target assistance request has been set. In response to determination that the priority level of the at least one target assistance request has not been set (NO in step S166), the travel-assist control routine proceeds to step S168A.

In step S168A, the assistance controller 52 determines whether there is at least one standby management operator OP included in the second group.

In response to determination that there is at least one standby management operator OP included in the second group (YES in step S168A), the travel-assist control routine proceeds to step S170. In step S170, the assistance controller 52 checks the content of the at least one target assistance request, and thereafter performs the priority manual setting task of manually setting the priority level of the at least one target assistance request. Thereafter, the travel-assist control routine proceeds to step S172A.

Otherwise, in response to determination that the priority level of the at least one target assistance request has been set (YES in step S166), the travel-assist control routine proceeds to step S172A.

In step S172A, the assistance controller 52 determines, again, whether there is at least one standby management operator OP included in the second group.

In response to determination that there are no standby management operators OP included in the second group (NO in step S172A), the travel-assist control routine proceeds to step S174. Additionally, in response to determination that there are no standby management operators OP included in the second group (NO in step S168A), the travel-assist control routine proceeds to step S174.

In step S174, the assistance controller 52 queues the at least one target assistance request, i.e., places the at least one target assistance request, into a queue, and thereafter terminates the travel-assist control routine. That is, when the travel-assist control routine has reached step S174, assignment of the at least one travel assistance request to any of the operator terminals 40 and 41 is not carried out.

Otherwise, in response to determination that there is at least one standby management operator OP included in the second group (YES in step S172A), the travel-assist control routine proceeds to step S176A.

In step S176A, i.e., in response to determination that it comes down to the on-peak situation that there are no standby instruction-operator terminals 40, the assistance controller 52 performs the operator-assignment control subroutine (see FIG. 6) for assigning the at least one target assistance request to a selected one of the management-operator terminals 41.

In the subroutines illustrated in FIGS. 7 to 14, the phrase "instruction-operator terminal(s)" can be appropriately read as "operator(s) belonging to the first group", and the phrase "management-operator terminal(s)" can be appropriately read as "operator(s) belonging to the second group".

The ninth embodiment corresponds to the first embodiment in TABLE 2.

Each program set forth above has been installed, i.e., stored, in the storage unit according to each embodiment, but the present disclosure is not limited thereto.

Specifically, each program can be stored in a non-transitory storage media, and executing each program carries out the routine implemented by the corresponding program. Each program can be offered in the form of being stored in a non-transitory storage media, such as a computer disk read only memory (CD-ROM), a digital versatile disk read only memory (DVD-ROM), a universal serial bus (USB) memory, or a semiconductor memory. Each program can be downloaded from an external device through a network to at least one processor.

While the illustrative embodiments of the present disclosure have been described herein, the present disclosure is not limited to the embodiments and their configurations described herein. Specifically, the present disclosure includes various modifications and/or alternatives within the scope of the present disclosure. In addition to various combinations and forms, other combinations and forms including one or more/less elements thereof are also within the inventive principle and scope of the present disclosure.

The invention claimed is:

1. A travel assist system for assisting traveling of at least one autonomous vehicle in response to at least one assistance request sent from the at least one autonomous vehicle, the travel assist system comprising:

a plurality of terminals, each of which is configured to perform first function and a second function, the first function of each of the terminals generating, based on input information entered by at least one of first operators belonging to a first group, instruction information related to traveling of the at least one autonomous vehicle, the second function of each of the terminals reporting, based on input information entered by at least one of second operators belonging to a second group, information representing a working situation of each of the first operators belonging to the first group; and a travel assist control unit comprising a computer and configured to selectively perform:

an off-peak task upon receiving the at least one assistance request during an off-peak situation where there are a predetermined number of free operators included in the first group, the off-peak task being configured to assign the at least one assistance request to a selected one of the free operators included in the first group; and an on-peak task upon receiving the at least one assistance request during an on-peak situation where there are not the predetermined number of the free operators included in the first group, the at least one assistance request comprising a quantified priority level, the on-peak task being configured to:

determine whether the quantified priority level of the at least one assistance request is higher than or equal to a predetermined threshold priority level; and analyze the assignment of the at least one assistance request to a selected one of the second operators included in the second group in response to a determination that the quantified priority level of the at least one assistance request is higher than or equal to the predetermined threshold priority level.

2. The travel assist system according to claim 1, wherein:

each of the first and second operators who logs in to a corresponding one of the terminals is categorized into a corresponding one of the first and second groups in accordance with a predetermined standard determined for the corresponding one of the first and second operators; and the plurality of terminals are categorized into:

instruction terminals operatable by the first operators belonging to the first group; and management terminals operatable by the second operators belonging to the second group.

3. The travel assist system according to claim 1, wherein:

the at least one assistance request comprises a plurality of assistance requests;

the quantified priority level comprises a plurality of qualified priority levels; and the second function of each of the terminals includes a function of individually setting each of the plurality of assistance requests to a corresponding one of the plurality of priority levels.

4. The travel assist system according to claim 1, wherein:

the travel assist control unit is configured to:

determine, before execution of the on-peak task, whether pending assistance requests currently addressed by the terminals include at least one pending assistance request whose quantified priority level is lower than or equal to a predetermined threshold priority level; and assign, upon determination that the pending assistance requests currently addressed by the terminals include the at least one pending assistance request whose quantified priority level is lower than or equal to the predetermined threshold priority level, the at least one assistance request to at least one terminal currently addressing the at least one pending assistance request.

5. The travel assist system according to claim 4, wherein:

the travel assist control unit includes an operator working-situation database that stores working-situation information indicative of a current working situation of each of the terminals; and the travel assist control unit is configured to determine, based on the working-situation information stored in the operator working-situation database, whether the pending assistance requests currently addressed by the terminals include the at least one pending assistance request whose quantified priority level is lower than or equal to the predetermined threshold priority level.

6. The travel assist system according to claim 1, wherein:

the travel assist control unit is configured to:

predict, before execution of the on-peak task, completion time for each of pending assistance requests currently addressed by the terminals, the completion time for each of the pending assistance requests being required until addressing of the corresponding one of the pending assistance requests is completed; and place, upon determination that the completion time for at least one of the pending assistance requests is smaller than or equal to a completion-time threshold, the at least one assistance request into a queue.

7. The travel assist system according to claim 6, wherein:

the travel assist control unit includes an assistance-log database that stores log information that includes (i) assistance-request logs and (ii) predicted remaining time length for each of pending assistance requests currently addressed by the terminals; and the travel assist control unit is configured to predict, based on the log information stored in the assistance-log database, the completion time for each of the pending assistance requests currently addressed by the terminals.

8. A program product for a computer, the program product comprising:

a non-transitory computer-readable medium; and a set of computer program instructions embedded in the computer-readable medium, the instructions causing the computer to serve as the travel assist control unit according to claim 1.

9. The travel assist system according to claim 1, wherein:

the at least one assistance request represents an occurrence of an event constituting a hindrance to an autonomous traveling of the at least one autonomous vehicle; and the on-peak task being configured to:

determine whether the quantified priority level of the at least one assistance request is higher than or equal to the predetermined threshold priority level; and analyze the assignment of the at least one assistance request to the selected one of the second operators included in the second group in response to determination that the quantified priority level of the at least one assistance request is higher than or equal to the predetermined threshold priority level, wherein at least one of the terminals is configured to perform, through operations of the selected one of the second operators, driving assistance of the at least one autonomous vehicle to cause the at least one autonomous vehicle to continuously travel.

10. The travel assist system according to claim 1, wherein:

one of the first operators and the second operators performs traveling assistance of the at least one autonomous vehicle.

11. A travel assist system for assisting traveling of at least one autonomous vehicle in response to at least one assistance request sent from the at least one autonomous vehicle, the travel assist system comprising:

a plurality of instruction terminals, each of which is configured to perform an instruction function of generating instruction information in response to the at least one assistance request;

at least one management terminal configured to perform the instruction function, and manage an operating condition of each of the plurality of instruction terminals; and a travel assist control unit comprising a computer and configured to selectively perform an off-peak task and an on-peak task in accordance with the operating condition of each of the plurality of instruction terminals, the off-peak task being configured to, upon receiving the at least one assistance request during an off-peak situation where there are a predetermined number of free terminals included in the plurality of instruction terminals, assign the at least one assistance request to a selected one of the free terminals included in the plurality of instruction terminals, the at least one assistance request comprising a quantified priority level, the on-peak task being configured to, upon receiving the at least one assistance request during an on-peak situation where there are not the predetermined number of the free terminals included in the plurality of instruction terminals, determine whether the quantified priority level of the at least one assistance request is higher than or equal to a predetermined threshold priority level, and analyze assignment of the at least one assistance request to the at least one management terminal in response to a determination that the quantified priority level of the at least one assistance request is higher than or equal to the predetermined threshold priority level.

12. The travel assist system according to claim 11, wherein:

the on-peak task performed by the travel assist control unit is configured to assign, upon determination that the quantified priority level of the at least one assistance request is higher than or equal to the predetermined threshold priority level, the at least one assistance request to the at least one management terminal, and place, upon determination that the quantified priority level of the at least one assistance request is lower than the predetermined threshold priority level, the at least one assistance request into a queue.

13. The travel assist system according to claim 11, wherein:

the travel assist control unit is configured to:

predict, before execution of the on-peak task, a time period for which at least one new assistance request after the at least one assistance request will occur;

predict the quantified priority level of the at least one new assistance request;

calculate a probability that the at least one new assistance request, whose quantified priority level is higher than the predetermined threshold priority level, will occur for the time period; and assign the at least one assistance request to the at least one management terminal upon determination that the calculated probability is higher than or equal to a predetermined threshold.

14. The travel assist system according to claim 13, wherein:

the travel assist control unit includes an assistance-occurrence prediction database that stores big data, the big data comprising:

first information including past positions of the at least one autonomous vehicle;

second information including past travel routes of the at least one autonomous vehicle;

third information including past traffic situations related to traveling of the at least one autonomous vehicle;

fourth information including past weather conditions related to traveling of the at least one autonomous vehicle;

fifth information including at least one past assistance for the at least one autonomous vehicle; and sixth information indicative of a time length required to execute the at least one past assistance; and the travel assist control unit is configured to predict (i) the time period for which the at least one new assistance request after the at least one assistance request will occur, and (ii) the quantified priority level of the at least one new assistance request in accordance with the big data stored in the assistance-occurrence prediction database.

15. The travel assist system according to claim 11, wherein:

the at least one assistance request represents an occurrence of an event constituting a hindrance to an autonomous traveling of the at least one autonomous vehicle; and the on-peak task being configured to:

determine whether the quantified priority level of the at least one assistance request is higher than or equal to the predetermined threshold priority level; and analyze the assignment of the at least one assistance request to the selected one of the free terminals in response to determination that the quantified priority level of the at least one assistance request is higher than or equal to the predetermined threshold priority level, wherein at least one of the terminals is configured to perform, through operations of the selected one of the free terminals, driving assistance of the at least one autonomous vehicle to cause the at least one autonomous vehicle to continuously travel.

16. The travel assist system according to claim 11, wherein:

the selected one of the free terminals performs traveling assistance of the at least one autonomous vehicle.

17. A method of assisting traveling of at least one autonomous vehicle in response to at least one assistance request sent from the at least one autonomous vehicle in a system comprising a plurality of terminals, each of which has a first function and a second function, the first function of each of the terminals generating, based on input information entered by at least one of first operators belonging to a first group, instruction information related to traveling of the at least one autonomous vehicle, the second function of each of the terminals reporting, based on input information entered by at least one of second operators belonging to a second group, information representing a working situation of each of the first operators belonging to the first group, the method comprising performing, upon receiving the at least one assistance request during an off-peak situation where there are a predetermined number of free operators included in the first group, an off-peak task of assigning the at least one assistance request to a selected one of the free operators included in the first group; and performing, upon receiving the at least one assistance request during an on-peak situation where there are not the predetermined number of the free operators included in the first group, an on-peak task, the at least one assistance request comprising a quantified priority level, the on-peak task comprising:

determining whether the quantified priority level of the at least one assistance request is higher than or equal to a predetermined threshold priority level; and analyzing the assignment of the at least one assistance request to a selected one of the second operators included in the second group in response to a determination that the quantified priority level of the at least one assistance request is higher than or equal to the predetermined threshold priority level.

18. A method of assisting traveling of at least one autonomous vehicle in response to at least one assistance request sent from the at least one autonomous vehicle in a system comprising (i) a plurality of instruction terminals, each of which is configured to perform an instruction function of generating instruction information in response to the at least one assistance request; and (ii) at least one management terminal configured to perform the instruction function, and manage an operating condition of each of the plurality of instruction terminals, the method comprising:

performing, upon receiving the at least one assistance request during an off-peak situation where there are a predetermined number of free terminals included in the plurality of instruction terminals, an off-peak task of assigning the at least one assistance request to a selected one of the free terminals included in the plurality of instruction terminals, the at least one assistance request comprising a quantified priority level; and performing, upon receiving the at least one assistance request during an on-peak situation where there are not the predetermined number of the free terminals included in the plurality of instruction terminals, an on-peak task of:

determining whether the quantified priority level of the at least one assistance request is higher than or equal to a predetermined threshold priority level; and analyzing assignment of the at least one assistance request to the at least one management terminal in response to a determination that the quantified priority level of the at least one assistance request is higher than or equal to the predetermined threshold priority level.

* * * * *